Figure 1:
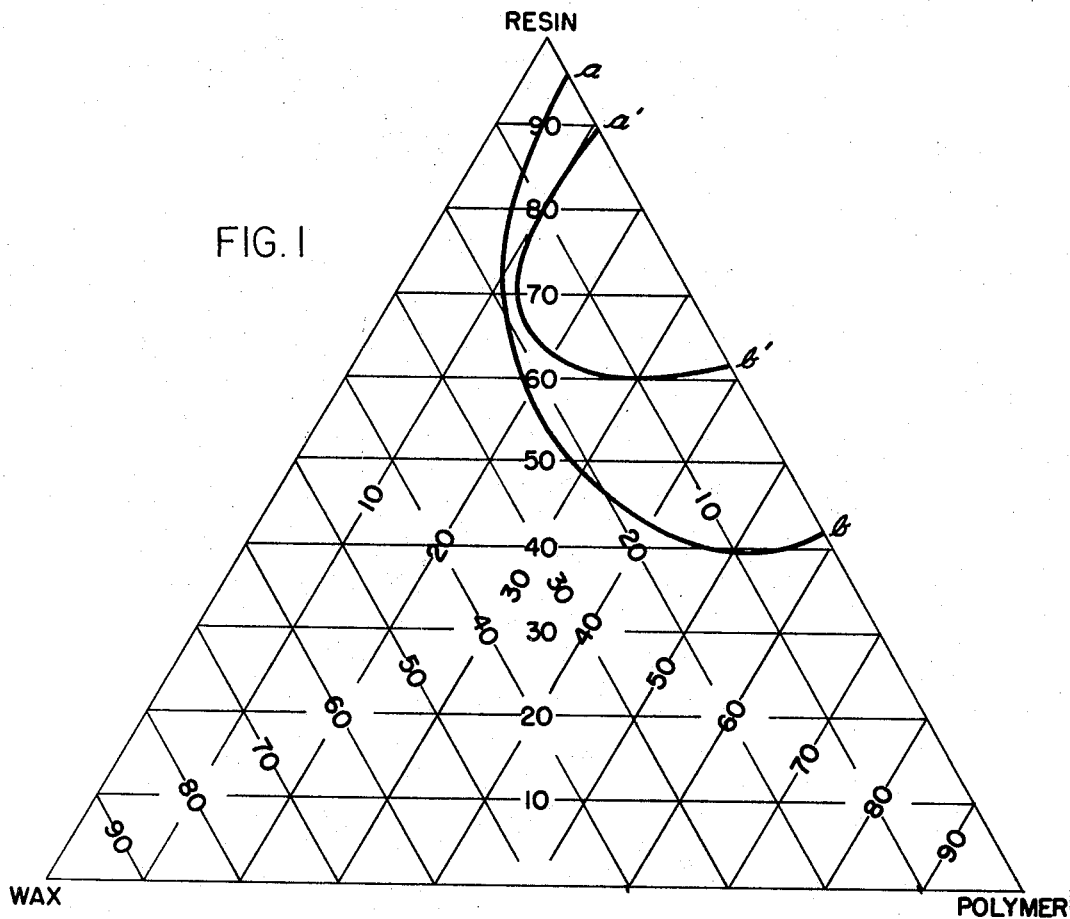

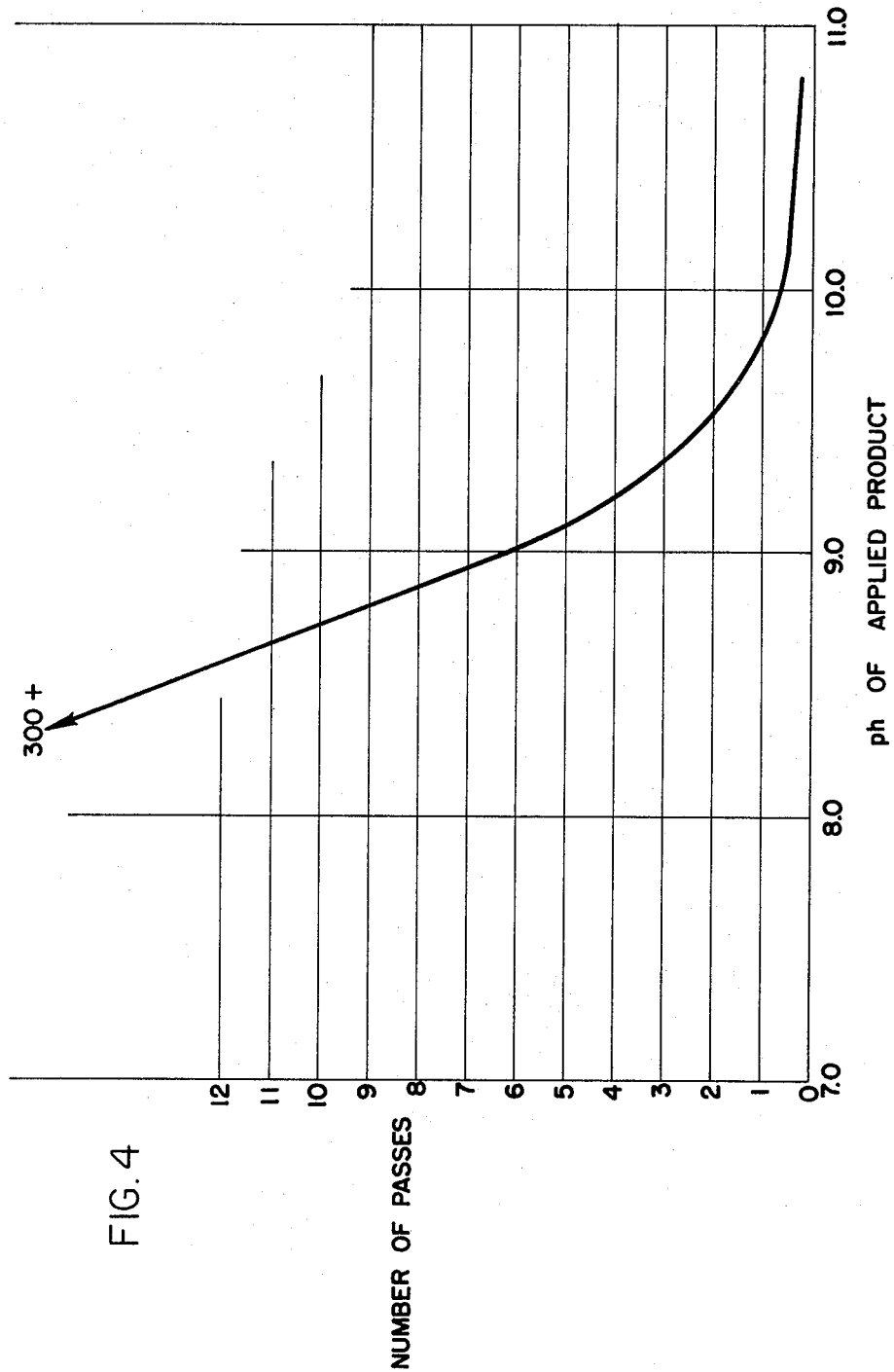

United States Patent Office 3,308,078
Patented Mar. 7, 1967

3,308,078
COATING COMPOSITIONS
John R. Rogers and Louis M. Sesso, Racine, Wis., assignors to S. C. Johnson & Son, Inc., Racine, Wis.
Filed Aug. 30, 1965, Ser. No. 483,761
15 Claims. (Cl. 260—27)

The present application is a continuation-in-part of application 329,206, filed December 9, 1963, which has been abandoned. Application 329,206 is a continuation-in-part of application 247,870, filed December 28, 1962, which has been abandoned.

The present invention relates to stable, aqueous coating compositions, to the films produced from these compositions, and to methods of removing these films from substrates. More particularly, this invention relates to improved stable aqueous coating compositions containing a polymer, a resin, and a metal-containing complex, to the unique films obtained from these compositions, and to the methods of removing these films.

In the protective coating field, such as temporary organo coatings including certain floor coatings, it is desirable to have minimum carboxyl functionality present in order to avoid the solubilizing and spotting effects normally obtained when water, detergents, various alkaline and other carboxyl-reactive substances are brought into contact with such coatings. However, the hardness, durability, gloss, and removability properties of certain films are affected by the degree of carboxyl functionality present. Therefore, most coating compositions developed heretofore represent a compromise with respect to properties such as hardness, durability, gloss, removability, and resistance.

It has been found that various organic films containing carboxyl functionality, sufficient to obtain easy removal, tend, upon aging, to undergo a degrading effect, i.e., loss of functionality and/or physical rearrangement which renders the carboxyl groups substantially unavailable. This degrading effect produces films which are difficult to remove by means of conventional film remover substances such as detergents and results in film build-up. Film build-up is usually accompanied by degradation in color, i.e., yellowing, and eventually necessitates complete film removal with highly caustic solutions or solutions containing organic solvents or by various abrasive methods, all of which have been found to affect the substrate adversely.

The present invention is directed to stable, aqueous coating compositions which provide metal-containing organic films having:
 (1) Unique structural integrity as evidenced by their resistance to substances such as water, detergents, mild alkali, and various organic materials;
 (2) Captive functional groups which are not degraded;
 (3) Controlled removability; and
 (4) High gloss, hardness, and durability.

COATING COMPOSITIONS

The coating compositions of the present invention are stable, aqueous compositions containing from about 5% by weight to about 40% by weight solids comprising:
 (A) An organic film former containing: a polyligand emulsion polymer described in detail infra, a resin cut containing an aqueous base and a polyligand alkali soluble resin;
 (B) Aqueous ammonia;
 (C) A metal-fugitive ligand complex; and
 (D) A stabilizing agent.

More particularly, the present invention is directed to a stable, aqueous coating composition containing from about 5% to about 40% by weight solids comprising:
 (A) An organic film former containing:
  (1) A polyligand emulsion polymer having a minimum film forming temperature (hereinafter referred to as MFT) of less than about 80° C. comprising:
   (a) From about 5% by weight (all percentages referred to hereinafter are by weight unless specifically indicated otherwise) to about 35% by weight of a ligand-containing, polymerizable, ethylenically unsaturated monomer and
   (b) From about 65% to about 95% of at least two different ligand-free, polymerizable, ethylenically unsaturated monomers,
  (2) A resin cut containing:
   (a) An aqueous base at least a major amount of the moles of which are comprised of an alkaline substance having a fugitive cation and
   (b) A polyligand alkali soluble resin having a number average molecular weight up to about 5,000 such as:
    (1) Condensation-type resins,
    (2) Addition-type resins, and
    (3) Mixtures of condensation-type resins and addition-type resins,
  wherein the weight ratio of resin to polymer is from about 20:80 to about 90:10;
 (B) Aqueous ammonia in a concentration sufficient to provide an equivalents of ammonium to total organic film former ligand equivalents ($NH_4^+/COO^-$) of at least about 0.7;
 (C) A metal-fugitive ligand complex which is capable of undergoing ligand transfer with ligands of the organic film former containing metals such as zinc, cadmium, copper and nickel; and
 (D) A stabilizing agent such as aqueous ammonia or a water soluble, nonionic ethylene oxide condensate emulsifier.

In a preferred embodiment, the stable aqueous coating compositions of the invention can be described as containing from about 5% by weight to about 20% by weight solids comprising:
 (A) An organic film former containing:
  (1) A polyligand emulsion polymer having a minimum film forming temperature of less than about 80° C. comprising:
   (a) From about 5% to about 35% by weight of a ligand containing, polymerizable, ethylenically unsaturated monomer having the structural formula

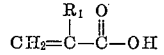

wherein $R_1$ is selected from the group consisting of hydrogen and a methyl radical and
   (b) From about 65% to about 95% by weight of at least two ligand-free, polymerizable, ethylenically unsaturated monomers selected from the group consisting of monomers having the structural formulas:

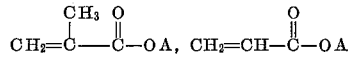

$CH_2=CH—X$ and mixtures thereof wherein A is an organo radical having from about one to about ten carbon atoms, and X is an organo radical selected from the group consisting of aryl and alkaryl radicals;
  (2) A resin cut containing:
   (a) An aqueous base, at least a major amount of the moles of which are comprised of an alkaline substance having a fugitive cation; and
   (b) A polyligand, alkali soluble resin having a number average molecular weight up to about 5,000 selected from the group consisting of:
    (1) Condensation-type resins having an acid number from about 120 to about 220, (2) Addition-type resins having an acid number from about 140 to about 300 containing at least two ethylenically unsaturated monomers having structural formulas:

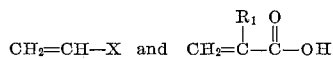

wherein X and $R_1$ are as defined above, and (3) Mixtures of said condensation-type resins and said addition-type resins, wherein the weight ratio of said resin to said polymer is from about 20:80 to about 90:10;

(B) Aqueous ammonia in a concentration sufficient to provide an equivalents of ammonium to total organic film former ligand equivalents ($NH_4^+/COO^-$) from about 0.7 to about 3.5;

(C) A metal-fugitive ligand complex which is capable of undergoing ligand transfer with ligands of the organic film former, represented by the structural formula:

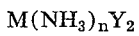

wherein M is a metal selected from the group consisting of Zn, Cd, Cu, Ni, and mixtures thereof, $n$ is the coordination number of said metal and is an integer from four to six, Y is an equivalent of a carboxyl containing anion selected from the group consisting essentially of carbonate, formate, acetate, said resin, said polymer and mixtures thereof in a concentration sufficient to provide a mole ratio of metal ions to total organic film former ligand equivalents ($M^{++}/COO^-$) from about 0.075 to about 0.500 and (D) A stabilizing agent selected from the group consisting of:

(1) Aqueous ammonia, (2) A water soluble, nonionic ethylene oxide condensate emulsifier and (3) Mixtures thereof in a combination and in a concentration sufficient to provide a change in optical density of no greater than about 0.1, with the proviso that the aqueous ammonia concentration is sufficient to provide an increase in said $NH_4^+/COO^-$ ratio up to about 2.8 with the total $NH_4^+/COO^-$ ratio being no greater than about 3.5 and that said emulsifier concentration is no greater than about 8% by weight.

In a particularly preferred embodiment the coating composition of the invention has an MFT below about 25° C. and a pH from about 8 to about 11.

It is essential that the coating compositions of the invention be stable. That is, in order to obtain the films of the invention these coating compositions must be substantially free from gelation and/or precipitation and have substantially the same composition throughout.

For the purposes of the present invention, a stable, coating composition is defined as a fluid substance which can be stored for prolonged periods and is: (a) substantially free from gelling, (b) substantially free from change in viscosity, and/or (c) substantially free from changes in the particle size of the dispersed solids. The stability of these coating compositions can be monitored by periodic optical density measurements. For example, the optical density of the coating compositions of the present invention has been observed after varying of storage at elevated temperatures, i.e., about 51° C. The optical density of these coating compositions is obtained by using a Bausch and Lomb Spectronic 20 Colorimeter with 2.5 ml. of the coating composition diluted to 100 ml. with deionized water. This is approximately equivalent to about 0.32 g. of solid per 100 ml. of deionized water. The wavelength of the light source is 500 millimicrons. It has been found that the stable coating compositions of the invention are substantially free from changes in viscosity and have a difference in optical density after seven days at about 51° C. of no greater than about 0.1.

In a preferred embodiment, the difference in optical density of stable coating compositions under substantially similar conditions is less than about 0.03. These optical density observations are discussed in various examples below.

Mixtures of: many polyligand polymers and water, certain alkali soluble polyligand resins and water and various metal-fugitive ligand complexes and water, are sufficiently stable so as to be useful in coating compositions. However, when various polyligand polymers, alkali soluble polyligand resins and metal-fugitive ligand complexes are mixed together in water, they often form unstable mixtures. It is believed that this instability is due at least in part to inter- and intra-molecular bonding occuring between the metal ions and the polymer and or resin, resulting in gelation, increase in particle size and/or precipitation.

The present invention is directed to unique and novel coating compositions comprising certain types of polymers, certain types of resins, metal-fugitive ligand complexes and stabilizing agents which are unexpectedly stable in water.

The stability of the aqueous coating compositions of the invention is particularly unobvious and unexpected since these compositions produce films upon drying which are characterized by substantial inter- and intra molecular bonding between the ligands of the film former and the metal ions. Such bonding would also be expected to take place in the liquid coating compositions. Although apparently some metal-carboxyl ligand bonding does occur in the ligand coating compositions of the invention, the extent of this bonding is unexpectedly controlled and is not sufficient to cause substantial gelation, substantial change in viscosity and/or substantial differences in optical density as discussed above. The influence of aqueous ammonia and/or of certain water soluble, nonionic, ethylene oxide condensate emulsifiers on the stability of the coating composition of the invention is discussed in detail infra.

The various components of the coating compositions will be discussed in detail below along with the unique and novel films of the invention and methods of removing same.

(A) *Organic film former*

The organic film former can be defined as a mixture of a resin cut containing a polyligand resin and an aqueous base and a polyligand emulsion polymer which is stable in the aqueous coating compositions of the invention. Additionally, the organic film former is characterized by its ability in the presence of certain metal ions to form metal-containing films characterized by unique structural integrity, controlled removability and containing captive carboxyl ligands. These properties of the film are discussed in detail infra. The unique properties of the film are attributed, at least in part to the presence of functional groups, i.e., carboxyl ligands of the polymer and resin. That is, these ligands play a key role in the ligand transfer and metal bonding which is required during film formation. The resulting metal-carboxyl ligand bonds contribute substantially to film resistance and to film removal.

As noted above, the weight ratio of resin to polymer in the organic film former of the invention can range from about 20:80 to about 90:10. In preferred embodiments, this ratio is at least in part determined by the solids content of the composition. For example, in particularly high solids compositions, i.e., containing up to about 40% by weight solids, the resin to polymer ratio is from about 20:80 to about 30:70, whereas in compositions having a solids content of less than about 20% by weight this ratio is from about 20:80 to about 90:10. The solids content of the coating compositions of the invention can range from about 5% by weight up to about 40% by weight.

The organic film former contains a mixture of resin and polymer or mixtures of various resins and various polymers. The resin and polymer components are discussed in detail below.

*Polymer*

The polyligand, emulsion polymer suitable as a component of the organic film former has an MFT of less than about 80° C. and contains:

(a) From about 5% to about 35% of a ligand-containing, polymerizable, ethylenically unsaturated monomer; and (b) From about 65% to about 95% of at least two ligand-free, polymerizable, ethylenically unsaturated monomers such as monomers having the structural formulas:

(I)

wherein A is an organo radical containing from one to about ten carbon atoms; A is preferably an alkyl radical having from one to about ten carbon atoms:

(II)

wherein A is as defined in Formula I above, and $$CH_2=CH-X \qquad (III)$$

wherein X is an aryl or alkaryl radical, X is preferably an aryl radical. The foregoing formulas shall be referred to hereinafter as Formulas I, II, and III, respectively.

Polymers suitable for the coating compositions of the present invention are characterized by their stability in the alkaline, aqueous coating compositions of the invention containing resin and certain metal-fugitive ligand complexes. These polymers have limited solubility in the coating compositions of the invention. Therefore a major amount of the polymer is present as a stable dispersion of emulsified particles. The unique stability of these dispersed polymer particles in the liquid coating compositions is attributed to the monomer components; the emulsifiers used during polymerization, to certain inherent physical properties of these polymers, to the resin and to the metal-fugitive ligand complex present. Other suitable polymers include certain alkali soluble polymers, that is, polymers which form substantially clear solutions in the coating composition of the invention, i.e., when from about 80% to about 90% of the polymer carboxyl groups are neutralized with ammonium hydroxide.

Suitable emulsion polymers can be described structurally as linear and branched chain addition polymers. The structural nature of the polymer is belived to contribute significantly to the unexpected properties of the films of the invention and to the stability properties of the coating compositions. That is, when these polymers are included in the coating compositions of the invention, they have been found to impart unexpected and unobvious stability to the coating compositions and yet produce the unique films of the invention.

For purposes of the present invention, a ligand is defined as an atom, molecule or ion which is able to donate a pair of electrons to an atom, molecule or ion which can accept a pair of electrons. The result is a coordinate covalent bond formed by a pair of electrons shared between two atoms, molecules or ions. In metal coordination compounds, i.e., complexes, a metal ion accepts the pair of electrons from the ligand. Preferred ligands for the polymer component of the film former are substances containing functional groups such as carboxyl ions. In addition to undergoing ligand exchange with the metal-fugitive ligand complex to form ligand-metal bonds, the ligands of the polymer are also capable of undergoing salt formation with various alkaline substances such as ammonium and sodium hydroxide. In a film, these ligands are further characterized as being able to undergo displacement from the metal ions when the film is treated with an alkaline solution containing a complexing agent, i.e., a substance containing a ligand capable of achieving ligand displacement. In the metal-fugitive ligand complex the ligand is preferably a ligand such as ammonia which is fugitive and capable of supporting ligand transfer with at least some of the carboxyl ligands of the organic film former. For the purposes of the present invention the polymer and resin ligands, unless described otherwise, shall be carboxyl ligands and the ligands of the metal-fugitive ligand complex, unless described otherwise, shall be fugitive ligands such as ammonia.

For the purposes of the present invention, a polyligand is defined as a substance containing two or more atoms, molecules or ions capable of forming coordinate bonds, i.e., containing two or more functional groups such as two carboxyl ions each of which is capable of furnishing a pair of electrons.

It is essential that a free radical emulsion polymerization process, such as described in "Fundamental Principles of Polymerization" by G. F. D'Alelio, published by J. Wiley & Sons, Inc., New York, N. Y., (1952) pp. 201 et seq., be used in preparing the polyligand emulsion polymers used in the coating compositions of the invention. By means of this addition-type polymerization, the ligands of the ligand-containing monomer are included in the polymer in a substantially unreacted state. That is, the carboxyl groups

groups, of the ligand-containing monomers appear in the polymer as such. The presence of these

groups in the polymer is essential to the invention. In addition, since certain of these polyligand polymers have limited water solubility, it is essential that they form stable dispersions in water in order to comply with the stability requirements of the coating compositions of the invention. The polymeric reaction products obtained from emulsion polymerization are stable aqueous dispersions of polymer particles.

Anionic emulsifiers are preferred in the free radical emulsion polymerization processes used to prepare the polymers for the coating compositions of the invention. Certain cationic, amphoteric, and nonionic emulsifiers are not preferred since they tend to react with the carboxyl groups of the monomer and/or polymer and/or are neutralized by the alkaline coating compositions of the invention. Moreover, it has been found difficult to polymerize polymers of the invention having suitable particle size (i.e., stability) when using certain nonionic emulsifiers. Mixtures of various emulsifiers are considered useful.

The stable dispersions of emulsified polymer particles can be prepared by emulsifying, at temperatures ranging from about 30° C. to about 100° C. and preferably from about 50° C. to about 80° C., a mixture of the various monomers in water and polymerizing the mixture while it is in the emulsified form. Examples of useful anionic emulsifiers include: sodium lauryl sulfate, sodium salts of alkylaryl polyether sulfonates and sodium salts of alkylnaphthalene sulfonates. Of course, other substances such as the ammonium and potassium salts of these compounds can also be used.

Free radical emulsion polymerization catalysts such as water soluble peroxides, water soluble peroxides in combination with reducing agents (redox systems, or oil soluble peroxides can be employed in preparing the polyligand polymers. Particularly preferred catalysts include the water soluble persulfates such as ammonium persulfate and potassium persulfate.

The concentration of catalyst and emulsifier employed during polymerization has been found to influence the performance of films containing polymers prepared in this manner. The concentration of catalyst can range from about 0.2% to about 3.5%. In a preferred embodiment, the catalyst concentration is from about 0.5% to about 1.5%. In particularly preferred embodiment, the catalyst is present at about 0.5%. The concentration of emulsifier can range from about 0.5% to about 10%. In a preferred embodiment, the emulsifier concentration is from about 1% to about 5%. In a particularly preferred embodiment, the emulsifier concentration is about 3%. These concentration values are based on the total monomer content.

It has been found that certain polymers useful in the coating compositions of the invention are preferably prepared under free radical emulsion polymerization conditions in the absence of chain-transfer agents. The above described polymers can be prepared by heating the mixture of monomers, catalyst, emulsifier, and reaction solvent below or at the reflux temperature of the solvent.

The polyligand polymers useful in the coating compositions of the invention can be generally described as high molecular weight substances. However, it should be understood that the specific molecular weight of these polyligand polymers is not critical. Although molecular weight determinations can be made on these polymers by means of intrinsic viscosity observations (see the discussion below), it should be understood that molecular weight per se is not controlling. Rather it is essential that these polymers be polyligand in nature, be obtained by means of emulsion polymerization, and form stable dispersions of polymer particles.

The molecular weights of these polymers can be determined by intrinsic viscosity measurements using a viscometer and a method such as described in "Preparative Methods of Polymer Chemistry," W. Sorenson et al., Interscience, New York, N.Y. (1961), pp. 34–42. It was found that polymers prepared in the absence of chain-transfer agents such as described above generally have an intrinsic viscosity of at least about 0.43 deciliters/gram at 25° C. which corresponds to a molecular weight of approximately 200,000. Preferred polymers prepared in this manner which are useful in the present invention have molecular weights from about 200,000 to about 570,000. Whereas, polymers prepared in the presence of chain-transfer agents having molecular weights from about 44,000 to about 200,000 are useful. These polymers generally have an intrinsic viscosity of at least about 0.15 deciliters/gram at 25° C. It is understood that the intrinsic viscosity of a polymer will vary with polymer structure and with the particular solvent employed when making the intrinsic viscosity determination. An additional discussion of intrinsic viscosity appears in Example 170 infra.

In addition to being stable in the aqueous coating compositions of the invention, the addition-type, emulsion polymers, when combined with resin and metal ions in a chemically resistant film, must be capable of being redispersed upon application to the film of an alkaline solution containing a complexing agent, which effects displacement of the captive polymer ligands from the metal ions. The addition of the complexing agent/alkaline aqueous medium affects the metal bonding between various carboxyl groups and results in film break-up. Upon break-up of the film it is essential that the polymer constituent be at least partially redispersible in the complexing agent/alkaline aqueous medium in order to achieve optimum removability of the film from the substrate.

The polymer ligands will usually undergo alkaline salt formation after displacement from the metal ions and thereby assist in the formation of dispersible polymer particles. It is known that the emulsifiers associated with the dispersed polymer particles obtained during emulsion polymerization are included with the polymer in the film. Although conceivably some of these emulsifiers may be leached from the film, it is thought that they are present in concentrations sufficient to assist in redispersing the polymer particles during film removal. In addition, the redispersing of these polymer particles is supplemented by the alkali soluble resins present which also function as emulsifiers, and by any detergent contained in the complexing agent/alkaline aqueous medium. Thus, it is evident that only emulsion polymers which readily lend themselves to emulsifying and redispersion are suitable for the coating compositions of the present invention.

For the purposes of the present invention, minimum film forming temperature (MFT) is defined as the minimum temperature at which a polymer emulsion (or a coating composition) will deposit a continuous film. The apparatus used and the method for the determination of the MFT of the polymer emulsion is described in "Journal of Applied Polymer Science," vol. IV, Issue No. 10, pp. 81–85 (1960). MFT is a means of establishing emulsion polymer hardness, i.e., brittleness, and is controlled by the concentration, proportion, and chemical nature of the component monomers. For example, it has been observed that emulsion polymers having an MFT substantially greater than about 80° C. are too brittle to be useful in the coating compositions of the invention. Therefore, the selection of suitable monomers for the polymers useful in the coating compositions of the invention is determined at least in part by the MFT of the polymer emulsion. The influence of polymer MFT on the coating composition of the invention is discussed in detail infra.

*Ligand-containing monomer*

The ligand-containing, polymerizable, ethylenically unsaturated monomer provides the necessary functionality to obtain metal bonding with polymer and resin molecules. It is thought that the ligands of the polymer contribute substantially to film performance, including properties such as hardness, gloss and durability and also to the unique chemical resistance and controlled removability characteristics of the film.

Carboxyl groups are particularly preferred polymer ligands. Examples of ligand-containing polymerizable, ethylenically unsaturated monomers wherein the ligand is a carboxyl group include methacrylic acid and acrylic acid and mixtures thereof. Preferred ligand containing monomers can be described by the following structural formula:

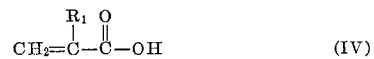     (IV)

wherein $R_1$ can be hydrogen or a methyl radical. This structural formula shall be referred to hereinafter as Formula IV. For the purposes of the present invention carboxyl-type ligands are limited to the functional group

and accordingly similar functional groups such as esters, e.g.

are not considered ligands.

It has been found that the total ligand-containing monomer content can comprise up to about 35% of the polymer. Although the ligand containing monomer content of the polymer can be comprised of mixtures of ligand containing monomers it is essential that the monomer comprising the remainder of the polymer, i.e., the Formulas I, II, and III monomers, be ligand-free. In a preferred embodiment the concentration of the Formula IV monomer is preferably from about 5% to about 25% of the polymer.

As noted above, the ligand-containing monomer provides the requisite functionality to the polymer necessary to obtain polymer/metal bonding during film formation. That is, the ligand-containing monomer provides the polymer with the functional sites required for the ligand transfer which takes place between the metal-fugitive ligand complex and the polymer and thus contributes to the formation of a film having captive ligands. It should be noted here that these captive ligands (discussed in detail below) not only impart unique chemical resistance to the film but also play a key role in film removal. Therefore, it can be appreciated that the presence of ligand-containing monomers in the polymers is critical to the coating compositions.

*Ligand-free monomers*

For the purposes of the present invention, a monomer is considered to be ligand-free when it does not contain atoms, molecules or ions normally capable of forming coordinate bonds. In a preferred embodiment of the invention, a ligand-free monomer is defined as a monomer free from any atom, molecule or ion capable of forming a coordinate bond such as a carboxyl ion. Suitable ligand-free monomers must be capable of undergoing addition-type emulsion polymerization with the other monomers of the polymer. Therefore, the ligand-free monomers are ethylenically unsaturated and include monomers such as styrene, vinyl toluene, acrylates such as 2-ethylhexyl acrylate and ethyl acrylate and methacrylates such as ethyl methacrylate and butyl methacrylate. These ligand-free monomers will comprise from about 65% to about 95% of the polymer. In a preferred embodiment these monomers will comprise from about 75% to about 95% of the polymer.

Examples of methacrylate monomers, i.e., Formula I monomers, include methyl methacrylate, ethyl methacrylates including hydroxyethyl methacrylate, various propyl methacrylates, various butyl methacrylates including tertiary butyl methacrylate, various pentyl methacrylates, various hexyl methacrylates, various heptyl methacrylates, various octyl methacrylates, including 2-ethylhexyl methacrylate, various nonyl methacrylates and various decyl methacrylates.

When it is present in the polymer the methacrylate monomer will preferably comprise a substantial amount by weight of the polymer. That is preferably the methacrylate monomer will comprise at least from about 35% to about 85% of the polymer. In a particularly preferred embodiment of the invention the methacrylate monomer will comprise from about 50% to about 75% of the polymer.

Examples of acrylate monomers, i.e., Formula II monomers, include methyl arcylate, various ethyl acrylates, such as hydroxyethyl acrylate, various propyl acrylates, various butyl acrylates including tertiary butyl acrylate, various pentyl acrylates, various hexyl acrylates, various heptyl acrylates, various octyl acrylates including 2-ethylhexyl acrylate, various nonyl acrylates and various decyl acrylates. Certain other branched acrylates which can also be used include: 3-ethylhexyl acrylate, 3,4-dimethylhexyl acrylate, 2-ethylheptyl acrylate, 3-ethylheptyl acrylate, 4-ethylheptyl acrylate, 3-methylheptyl acrylate, 4-methylheptyl acrylate, 5-methylheptyl acrylate, 6-methylheptyl acrylate, 2-3-dimethylheptyl acrylate, n-octyl acrylate, 3-ethyloctyl acrylate, 5-ethyloctyl acrylate, 2,3-dimethyloctyl acrylate, 3-methyloctyl acrylate, 6-methyloctyl acrylate, isopropyl acrylate and isobutyl acrylate.

When the arcrylate monomer is present in the polymer it can comprise from a minor amount to a substantial percent of the polymer. For example, the acrylate monomer can comprise from about 15% to about 85% of the polymer. In a particularly preferred embodiment of the invention the acrylate monomer will comprise from about 20% to about 60% of the polymer.

Examples of Formula III monomers include vinyl toluene and styrene. When these monomers are present in the polymer they comprise from about 10% to about 70% of the polymer.

When the compositions of the invention are used in floor coating applications, it has been found that in addition to the Formula IV monomer the polymer must contain at least two additional different monomers selected from the Formulas I, II, and III monomers in order to provide a coating composition which produces an acceptable film. For example, when a polymer containing methyl methacrylate, 91%, and methacrylic acid, 9%, is added to the coating compositions of the invention, a discontinuous crazed film is obtained. However, when about 31% of 2-ethylhexyl acrylate is added to a monomer mixture containing methylmethacrylate, 60%, and methacrylic acid, 9%, and the resulting polymer is added to a similar coating composition, a continuous film, free from crazing, is obtained.

Suitable polyligand emulsion polymers include terpolymers such as methyl methacrylate/2-ethylhexyl acrylate/ acrylic acid, methyl methacrylate/2-ethylhexyl acrylate/ methacrylic acid, methyl methacrylate/butyl acrylate/ methacrylic acid, methyl methacrylate/butyl acrylate/ acrylic acid, ethyl methacrylate/2-ethylhexyl acrylate/ acrylic acid, ethyl methacrylate/2-ethylhexyl acrylate/ methacrylic acid, ethyl methacrylate/butyl acrylate/methacrylic acid and ethyl methacrylate/butyl acrylate/methacrylic acid and ethyl methacrylate/butyl methacrylate/ acrylic acid. It should be understood that the polyligand emulsion polymers described above can contain various mixtures of each of the component monomers. For example, a mixture of suitable Formula I monomers can be polymerized with mixtures of Formula II monomers and mixtures of Formula III monomers provided the various monomers are present in the proportions discussed above.

When the coating compositions of the invention are to be used as floor coatings, the type of polymer employed in the composition is more critical than when these compositions are used in other coating applications. That is, floor coating compositions should preferably form hard, continuous durable films in a relatively short period after application to the substrate. It has been found that the particular Formula I, Formula II, and Formula III monomers employed and the ratio of these monomers in the above described polymers are critical when coating compositions containing these polymers are used as a floor coating. That is, various Formula I, Formula II, and Formula III monomers in certain ratios have been found to produce polymers which form soft coatings at ambient temperature and are undesirable for application to floors. It is thought that certain of the Formula I and Formula II monomers function as internal plasticizers in the polymer. It has been established that the hardness (suitability for use in floor coatings) of certain polymers can be controlled by the type of monomers used and the concentration of each in the polymer.

The effect on polymer hardness produced by an increase in the chain length of the ester alkyl group of certain acrylate and methacrylate esters of Formula I and II monomers can be further illustrated by observing the brittle points of various n-alkyl acrylate and methacrylate homopolymers. See, for example, "Industrial and Engineering Chemistry," vol. 40, pp. 1429 et seq. (1948).

As noted above, the selection of Formulas I, II, and III monomers and the concentration of these monomers determines the MFT of the resulting polymer. It has been observed that if a polymer has an MFT above about 80° C., it will not be suitable for the coating compositions of the present invention since it produces a crazed and/or discontinuous film.

Examples of other polymers which were found to have unsatisfactory MFT's and produced unsatisfactory films are set forth in Table I.

Examples of polymers which have MFT's below about 80° C. and which produce acceptable films are listed in Table II.

TABLE I

| Formula I Monomer | Formula II Monomer | Formula III Monomer | Formula IV Monomer | Polymer MFT., °C. |
|---|---|---|---|---|
| Ethyl methacrylate (20) | | Styrene (71) | Methacrylic acid (9) | >100 |
| Ethyl methacrylate (80) | | Styrene (11) | ---do--- | 90 |
| Methyl methacrylate (71) | | | ---do--- | 81 |
| Do | Ethyl acrylate (20) | | ---do--- | 80 |
| Do | Butyl acrylate (20) | | ---do--- | 82 |
| | 2-ethylhexyl acrylate (20) | | ---do--- | 85 |
| | Butyl acrylate (20) | Styrene (71) | ---do--- | 85 |
| | Ethyl acrylate (20) | ---do--- | ---do--- | 89 |

The number in parentheses equals the percent by weight of the monomer in the polymer.

TABLE II

| Formula I Monomer | Formula II Monomer | Formula III Monomer | Formula IV Monomer | Polymer MFT., °C. |
|---|---|---|---|---|
| Butyl methacrylate (80) | | Styrene (11) | Methacrylic acid (9) | 59 |
| Methyl methacrylate (31) | Ethyl acrylate (60) | | ---do--- | <80 |
| Methyl methacrylate (11) | Butyl acrylate (80) | | ---do--- | <80 |
| Methyl methacrylate (60) | 2-ethylhexyl acrylate (31) | | ---do--- | 55 |
| Methyl methacrylate (31) | 2-ethylhexyl acrylate (60) | | ---do--- | ≤ 0 |
| Methyl methacrylate (47) | 2-ethylhexyl acrylate (47) | | Methacrylic acid (6) | 10 |
| Methyl methacrylate (40) | 2-ethylhexyl acrylate (40) | | Methacrylic acid (20) | 50 |
| Butyl methacrylate (20) | Ethyl acrylate (71) | | Methacrylic acid (9) | <80 |
| | Ethyl acrylate (80) | Styrene (11) | ---do--- | <80 |
| | Butyl acrylate (80) | ---do--- | ---do--- | <80 |

The number in parentheses equals the percent by weight of the monomer in the polymer.

The effect of Formula I, Formula II, and Formula III monomers on MFT is apparent from the data set forth in Tables I and II above.

When the coating composition is to be employed as a floor coating it has been found that the MFT of the composition should preferably be below about ambient temperature, i.e., about 25° C. to avoid the formation of crazed films.

It is understood that certain polymers having marginal MFT's can be plasticized sufficiently with plasticizers such as tris-(butoxyethyl) phosphate to form films which have limited use in certain coating compositions. It has been found that most polymers having an MFT greater than about 20° C. can be plasticized to improve their film forming properties. In addition to conventional plasticizers, these polymers can also be plasticized with a soft polymer such as a soft terpolymer containing methyl methacrylate, 31%; 2-ethylhexyl acrylate, 60%; methacrylic acid, 9%; to produce an acceptable film. When more than one polymer is used in the coating compositions of the invention, the MFT of the polymer blend should be less than about 80° C. Accordingly, blends of polymers, wherein one of the polymers has an MFT greater than 80° C., can be successfully used in the coating compositions of the invention, provided that the MFT of the blend is less than about 80° C. Of course, these blends of polymers must be stable in the coating compositions of the invention.

Resin cut

Resin cuts suitable for use in the coating composition of the invention contain: (1) an aqueous base, at least a major amount of the moles of which are comprised of an alkaline substance having a fugitive cation and (2) a polyligand, alkali soluble resin.

The aqueous base can contain alkaline substances such as hydroxides including ammonium hydroxide, potassium hydroxide, sodium hydroxide, tetramethylammonium hydroxide, borax and mixtures thereof, various alkyl amines such as methyl amine, ethyl amine, propyl amine, morpholine, etc., and mixtures thereof provided that at least a major amount of the moles of said alkaline substance contain a fugitive cation such as an ammonium ion. In a preferred embodiment at least 50% of the moles of said alkaline substance is ammonium hydroxide.

The low molecular weight, polyligand, alkali soluble resins used in the coating compositions of the invention provide a substantial amount of the ligand functionality to these compositions. These resins have been found to contribute substantially to the stability of the coating compositions of the invention and to the controlled removability properties of the films of this invention. Certain of these resins and their method of preparation are described and claimed in copending application, Serial No. 467,121, filed June 25, 1965.

For the purposes of the present invention, a resin is considered alkali soluble when it contains no less than about 0.0025 equivalent of carboxyl groups per gram of resin and is capable of being substantially completely solubilized when a minimum of from about 80 to about 90% of these carboxyl groups are neutralized by an aqueous basic solution of substances such as borax, amines, ammonium hydroxide, sodium hydroxide, and/or potassium hydroxide. For example, a suitable styrene/acrylic acid resin having an acid number of about 190 would contain no less than about 0.0034 equivalent of carboxyl groups per gram of resin and would be substantially completely solubilized when a minimum of from about 80 to 90% of the carboxyl groups are neutralized by an aqueous base solution.

Resins suitable for use with the compositions of this invention can be described as: polyligand, alkali soluble substances having a molecular weight up to about 5,000 such as:

(1) Condensation-type resins having an acid number from about 120 to about 220, (2) Addition-type resins having an acid number from about 140 to about 300 containing at least two ethylenically unsaturated monomers such as Formula III and Formula IV monomers, i.e.

$$CH_2=CH-X \qquad (III)$$

wherein X is as defined above and

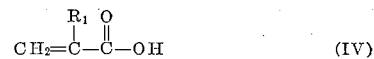
$$CH_2=\overset{R_1}{\underset{|}{C}}-\overset{O}{\underset{\|}{C}}-OH \qquad (IV)$$

wherein $R_1$ is as defined above and (3) Mixtures of said condensation-type resins and addition-type resins.

The acid number of the resins used in the present invention are the actual or observed values as distinguished from theoretical values and can be obtained by dissolving the resin in a solution containing 66% by weight ethanol and 34% by weight benzene and titrating the resin/solvent mixture to the phenophthalein end point with a 0.1 N aqueous NaOH solution. This general procedure is described by S. H. Pinner in "Practical Course in Polymer Chemistry" (1961), Pergamon Press, New York, N.Y., at p. 113.

It has been observed that the acid number of certain methacrylic acid-containing resins of the invention can be more readily obtained by dissolving the resin in acetone and titrating the resin/acetone mixture beyond the phenophthalein end point with a 0.1 N aqueous NaOH solution. The titrated resin/acetone mixture is then allowed to stand for about an hour at room temperature and is then titrated to the phenophthalein end point with a 0.1 N HCl solution. A solvent blank should be run under the same conditions as the acid number determination and the observed acid number for the resin corrected for the solvent effect. It has been observed that better reproducibility is obtained if titrations are carried out at room temperature. It is understood that for the purposes of the present invention the term acid value can be used interchangeably with the term acid number.

The acid number of the low molecular weight resins has been found to influence directly the solubility of these resins in the aqueous alkaline coating compositions and the chemical resistance and controlled removability properties of films produced from these compositions. For example, at an acid number substantially below about 140, i.e., about 110, certain of the addition-type resins are relatively insoluble in the aqueous coating compositions of the invention. When the acid number of the addition-type resins is substantially above about 250, certain of these resins fail to provide a chemically resistant film having controlled removability. It is suggested that when such high acid value resins are employed, it is difficult to obtain sufficient metal bonding during film formation, accordingly, the free carboxyl content is such that the resultant film is subject to attack by water and detergents. For certain coating applications, the acid value of suitable addition-type resins can range from about 140 to about 300. In a preferred embodiment, the acid value of these resins will range from about 190 to about 230. In a particularly preferred embodiment, the acid value of addition-type resins will be at least about 200. In the styrene/acrylic acid resins and styrene/methacrylic acid resins, the mole ratio of styrene to acrylic methacrylic acid can also be used to define the acid value. The acid value of suitable condensation-type resins can range from about 120 to about 220. In a preferred embodiment, the acid value of these resins will range from about 160 to about 210. In a particularly preferred embodiment the acid value of condensation-type resins will be at least about 180.

As noted above, the number average molecular weight of these resins can range up to about 5,000. In a preferred embodiment, the number average molecular weight is from about 600 to about 5,000. In a particularly preferred embodiment, the number average molecular weight is from about 600 to about 4,000. It is understood that all molecular weight values given for the resin throughout the specification and claims are number average molecular weights which can be determined by using a Vapor Pressure Osmometer model 301A, using a nonionized solvent such as methyl ethyl ketone. Accordingly, the term molecular weight as used hereinafter is intended to define number average molecular weight.

The molecular weight of the alkali soluble resins of the invention is critical in that outside the number average molecular weight range of up to about 5,000 certain resin cuts of the invention will not perform satisfactorily in the coating compositions of the invention.

A suitable molecular weight of a specific alkali soluble resin is in part dictated by its chemical composition. For example, suitable condensation polymerization resins which can be used in the coating compositions of the invention have molecular weights from about 600 to about 1400. In a preferred embodiment, the molecular weight can range from about 600 to about 800. In a particularly preferred embodiment, the molecular weight is about 700. These resins include certain polynuclear substances such as rosin/maleic anhydride adducts which are condensed with polyols such as ethylene glycol, propylene glycol, pentaerythritol, neopentyl glycol and mixtures thereof.

Examples of commercially available condensation polymerization resins suitable for use in the coating compositions of the invention which are rosin/maleic anhydride adducts condensed with polyols include:

(a) Durez 19788 and 15546 resins which have molecular weights of about 720 and 1,000 and acid numbers of about 200 and 140 respectively. Additional Durez resins include: Durez 17211 which has a molecular weight of about 950 and an acid number of about 150; Durez 23965 which has a molecular weight of about 720 and an acid number of about 140, and Durez 23971 which has an acid number of about 150;

(b) Shanco L–1165 which has a molecular weight of about 600 and an acid number of about 190, Shanco L–1165S which has a molecular weight of about 600 and an acid number of about 190, Shanco 60–61 which has a molecular weight of about 650 and an acid number of about 210, Shanco L–1177 which has an acid number of about 200, Shanco 60–72 which has a molecular weight of about 720 and an acid number of about 200, Shanco 60–85 which has an acid number of about 190, Shanco 60–58 which has a molecular weight of about 660 and an acid number of about 215, Shanco 64–29 which has an acid number of about 195, Shanco L–1180 which has an acid number of about 180, Shanco L–1174 which has an acid number of about 140, Shanco 60–96 which has an acid number of about 193, Shanco 60–97 which has an acid number of about 198, Shanco 60–98 which has an acid number of about 188.5, Shanco 64–77 which has an acid number of about 167, Shanco 64–73 which has an acid number of about 200, Shanco 64–75 which has an acid number of about 202, Shanco 64–79 which has an acid number of about 204, and Shanco 64–23 which has an acid number of about 128.

(c) Schenectady SR–88 which has a molecular weight of about 780 and an acid number of about 190, and Schenectady SR–91 which has an acid number of about 185.

(d) Alresat 618C has an acid number of about 180.

(e) Nelio VBR–7055 which has an acid number of about 200.

(Note: Where molecular weight is not stated, it is below about 5,000.)

In addition to the condensation-type resins certain addition-type polymerization resins such as styrene/acrylic acid resins having molecular weights up to about 5,000 are useful. Styrene/acrylic acid resins having molecular weights from about 1,000 to about 3,500 are preferred. In a preferred embodiment, the molecular weight of these addition-type resins can range from about 1,500 to about 2,500.

The addition-type resins such as the styrene/acrylic acid resins can contain up to about 25 mole percent of a modifying monomer such as: N-vinylpyrrolidone, diethylaminoethyl methacrylate, 2-methyl-5-vinylpyridine, acrylonitrile, methyl acrylate, butyl acrylate, 2-ethylhexyl acrylate, methyl methacrylate, and butyl methacrylate. These various modifying monomers can be represented by structural formulas such as:

  (I)

  (II)

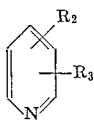

wherein A is as defined in Formulas I and II above and R₂ is a hydrogen or a methyl radical and R₃ is a vinyl radical.

Examples of other suitable addition-type resins include: styrene/acrylic acid resins having a molecular weight of about 3,000 and an acid number of about 200, styrene/acrylic acid having a molecular weight of about 2,500 and an acid number of about 180, styrene/acrylic acid having a molecular weight of about 4,000 and an acid number of about 160, styrene/acrylic acid having a molecular weight of about 3,700 and an acid number of about 240.

Similar to the emulsion polymers discussed above, the method of preparing certain of the low molecular weight addition-type resins of the invention is critical. These suitable low molecular weight resins, by definition, are polyligand in nature. The preferred ligand is a carboxyl group. In order to obtain polyligand resins, it is generally desirable to employ solution addition-type polymerization with polymerizable ethylenically unsaturated monomers, at least one one of which contains a carboxyl group. With the exception of certain condensation resins such as the modified rosin ester discussed above, it has been found that most resins obtained from condensation polymerization, which are characterized by relatively large concentrations of ester groups, or anhydride or ether linkages, fail to provide films having the required chemical resistance. Moreover, it has also been found that certain resins obtained by means of addition polymerization are not suitable if they contain relatively large concentrations of pendant ester groups. It is suggested that even though certain of the condensation resins discussed above have ester groups, the hydrophilic effect of these ester groups can be tolerated because of the more hydrophobic polynuclear backbone of the resin. Thus, these particular condensation resins are satisfactory.

The various styrene/acrylic-type alkali soluble resins are preferably obtained by means of solution polymerization. These resins and their method of preparation are described in detail in copending application, Ser. No. 467,121, referenced above.

In addition to the foregoing it is understood that other resins can be substituted at least in part for the resins described above. For example a suitable addition-type resin includes partially esterified styrene/maleic anhydride resins having acid numbers of about 200 and molecular weights of about 1,400. An example of such a resin available commercially is SMA 1400–A.

For the purposes of the present invention, a resin cut is defined as an alkaline aqueous solution obtained by solubilizing a polyligand resin with an aqueous base at least a major amount of the moles of which are comprised of an alkaline substance having a fugitive cation such as ammonium hydroxide. As noted above, other alkaline substances which can be used include potassium hydroxide, sodium hydroxide, borax, tetramethylammonium hydroxide, methyl amine, ethyl amine, propyl amine, morpholine, monoethanol amine, diethanol amine, triethanol amine and mixtures thereof provided that at least a major amount of said alkaline substance has a fugitive cation. The alkali soluble resins are used in the coating compositions of the invention as resin cuts.

The resin cut referred to above can be further described as comprising a substantially clear solution containing a low molecular weight polyligand, alkali soluble resin and an aqueous base, at least a major amount of the moles of base is comprised of an alkaline substance having a fugitive cation. The resin cut:

(a) has a pH greater than about seven, (b) is able to depress the surface tension of water by at least about 20 dynes/cm. at 25° C. at a concentration of about 20% by weight solids, (c) is a leveling agent.

The stoichiometric amount of alkaline substance such as NH₄OH required to neutralize all of the resin carboxyl groups will result in a resin cut having a pH of about eight. Thus in an ammonia cut resin of the invention having a pH greater than about eight, the carboxyl groups of the resin will be essentially 100% neutralized.

The effect these resins have on the surface tension of water is an indication of their usefulness as surfactants. That is, at concentrations of about 20% by weight solids, these resin cuts have been observed to depress the surface tension of water by at least about 20 dynes/cm. at 25° C. In such resin cuts the particularly preferred resins of the invention have been observed to reduce the surface tension of water from about 25 to 30 dynes/cm. at 25° C. Thus, it is apparent that these substances are effective polysurfactants in various aqueous base compositions.

The leveling properties of these substances can be observed when they are added to the coating compositions of the invention which are subsequently applied to a substrate. Under these conditions the resins are found to assist in the formation of uniform, continuous films which are usually characterized by high gloss. Therefore, for the purposes of the present invention a leveling agent is a resin cut which when added to a coating composition will:

(1) Effect an even flow-out of the coating composition upon application to a substrate and (2) Form a part of the resulting film upon drying of the coating composition and thereby influence the formation of a smooth, continuous film, substantially free from application marks.

As noted above at least a major amount, i.e., about 50%, of the moles of base in the resin cut is comprised of an alkaline substance having a fugitive cation, i.e., $NH_4^+$ which converts to volatile $NH_3$. The resin is present preferably as the soluble ammonium salt. It has been found that in order to obtain a chemically resistant film, a major amount of the alkaline component of the alkali soluble resin cut must contain a fugitive cation in order to obtain ligand transfer with the metal-fugitive ligand complex during film formation. However, it has been found that neutralization of about 40% of the resin carboxyl groups with a non-fugitive alkaline substance, e.g., sodium hydroxide, can be tolerated before metal-ligand bonding and film resistance is adversely affected. These resins are also relatively soluble in other aqueous alkaline media. For example, in addition to being soluble in the alkaline liquid coating compositions of the invention, these alkali soluble resins are soluble in the aqueous alkaline complexing mixtures used to remove the film from a substrate.

(B) *Aqueous ammonia*

Aqueous ammonia is present in the coating compositions of the invention in a concentration sufficient to provide an ammonium to total organic film former ligand equivalents ($NH_4^+/COO^-$) of at least about 0.7. The concentration of ammonia can be as high as that which will produce a $NA_4^+/COO^-$ of about 3.5. The ammonia concentration can also be established at least approximately by the pH of the coating composition (if there is essentially no other alkaline substance present). Since the coating compositions of the invention perform somewhat as buffered solutions it may be difficult to determine the exact $NH_4^+$ concentration by means of pH. The coating compositions of the invention have a pH range from about 8 to about 11 with a pH of about 9.2 preferred. The relationship between pH and $NH_4^+/COO^-$ is shown in Table III infra. In a preferred embodiment of the invention a portion of the aqueous ammonia present will be contributed by the aqueous base of the resin cut.

The influence aqueous ammonia has on the stability of the coating compositions of the invention will be apparent from the discussion of Tables III and IV infra. In fact, in certain coating compositions of the present invention aqueous ammonia in specified concentrations of $NH_4^+/COO^-$ and/or in combination with certain water soluble, nonionic ethylene oxide condensate emulsifiers is considered a stabilizing agent.

(C) *Metal-fugitive legand complex*

In addition to the organic film former discussed above, the liquid coating compositions of the invention contain a substance which can be described as a metal-fugitive ligand complex which is capable of undergoing ligand exchange with at least some of the carboxyl groups of the organic film former.

Suitable metal-fugitive ligand complexes which can be ideally represented by the structural formula $M(NH_3)_nY_2$ (wherein M, $n$, and Y are as defined above and include the ammonia complexes of zinc, cadmium, copper and nickel ions). It is understood that $n$ represents the coordination number of the metal ion. The $NH_3$ moiety comprises the fugitive ligand of the complex. It is understood that these stable, metal-fugitive legand complexes in the aqueous coating compositions of the invention will probably not be exactly as shown ideally above. For example, water of hydration may alter the values of $n$ in certain complexes. These metal-fugitive ligand complexes have these essential compartments including:

(a) the metal ion, i.e., $Zn^{++}$, $Cd^{++}$, $Cu^{++}$, or $Ni^{++}$, which is the bridging group that is capable of undergoing ligand transfer;

(b) a fugitive ligand, such as ammonia, $NH_3$, which readily converts under certain conditions to a volatile gas; and (c) an anion such as acetate, formate, carbonate and/or organic film former such as resin and/or polymer and mixtures thereof.

For the purposes of the present invention certain substances including ligands are considered fugitive if at least a portion thereof tends to volatilize under normal film forming conditions and tends to escape from the coating composition during the formation of the films of the invention.

Since ammonia can escape as a gas from the aqueous coating composition, it is readily apparent that the various metal-ammonia complex ions in the alkaline aqueous coating compositions of the invention can readily undergo ligand transfer with the carboxyl groups of the polymer and resin during film formation. Of course, as noted above, some of this ligand exchange occurs to a limited degree in the liquid coating compositions of the invention prior to film formation. However, since these coating compositions are preferably stored in a substantially airtight package, the concentration of fugitive substances in the head space of the package reaches an equilibrium which in turn limits the amount of ligand transfer taking place during storage.

It can be appreciated that the legand of the metal complex is fugitive and, therefore, during film formation legand transfer with the carboxyl groups of the film former is readily obtained. For example, it has been observed that if the ligand is not fugitive, i.e., (ethylenedinitrilo) tetraacetic acid, it tends to complete with the organic film former ligands in the formation of metal carboxyl bonds, thereby reducing organic film former/metal bonding. Since ligand transfer is essentially an equilibrium process, volatilization of a fugitive ligand such as ammonia shifts the equilibrium in favor of the formation of film former/metal bonding.

In addition to being fugitive, the ligand of the metal-ligand complex must be capable of being displaced by the ligands of the film former, i.e., displacement of ammonia from the metal-fugitive ligand by the carboxyl groups of the organic film former. Therefore, in addition to the fugitive nature of the ligands of the metal-fugitive ligand complex, ligand transfer is dependent, in part, upon the stability of the metal-fugitive ligand complex. That is, a metal ligand complex which is too stable in the coating composition would not be desirable since suitable ligand transfer would not be readily obtained during film formation. Examples of metal ligand complexes which are too stable in the coating composition and therefore do not promote suitable ligand transfer during film formation include substances such as the bis-(ethylenediamine) complexes to various zinc, cadminum, and copper salts and tris-(ethylene-diamine) complexes of nickel salts.

The metal-fugitive ligand complexes can be prepared from various water soluble metal salts. For example, salts having the formula $MY_2$ wherein Y is an anion such as acetate and M is as defined above. Aqueous solutions of the ammonia complexes of these metal salts can be readily prepared by adding aqueous ammonia to aqueous solutions of these slats. These aqueous ammonia metal salt solutions can be ideally represented as $M(NH_3)_nY_2$. It is to be understood that in these aqueous ammonia metal salt solutions, water and/or hydroxyl ions may replace some of the ammonia ligands. These solutions can then be added directly to the aqueous coating compositions of the invention.

The oxides of these metals, which are water insoluble, can also be used in the aqueous coating compositions of the invention. To form water soluble metal-fugitive ligand complexes from these oxides requires that the oxides be dissolved in the alkaline resin cut containing an excess of ammonia. These metal oxide/resin/excess ammonia solutions are desirable since in this manner a metal-fugitive ligand complex can be added to the coating compositions of the invention without introducing an extraneous anion such as an acetate anion. It has observed that the presence of these anions limits the addition of film forming aids such as wax and the like to the coating compositions of the invention. These anions reduce the stability of coating compositions containing such substances. Of course, when the oxides of the metal M are used the anion, Y, of the metal-fugitive ligand complex $M(NH_3)_nY_2$ will be a resin or polymer ion.

Unexpectedly, it has been found that if water soluble salts having the formula $MY_2$ are used to prepare the metal-fugitive ligand complexes of the invention, an anion capable of forming a weak, readily volatile acid such as acetic acid is preferred. For example, if the anion is capable of forming a relatively strong acid, as does a chloride ion, optimum metal bonding with the organic film former apparently is retarded at room temperature and optimum chemical resistance of the film is attained very slowly. For example, such a film would require heating for a prolonged period at about 45° C. to form a resistant film. However, where the anion of the complex $M(NH_3)_nY_2$ forms a volatile weak acid as does an acetate anion, maximum chemical resistance of the film is achieved rapidly at room temperature. The odor of the volatile acetic acid given off during film formation is readily apparent.

Several alkaline earth salts were compared with the metal salts described above in the coating compositions of the invention. Such ions are known to form extremely weak complexes with ammonia and other ligands and are generally considered to form electrostatic bonds with most ionic donor groups (i.e., ligands). That is, alkaline earth metal salts such as magnesium, barium, calcium, and strontium were found to produce films which did not have the desired chemical resistance. Thus, it is apparent that the electrostatic bonding obtained between these alkaline earth metal ions and the film former ligands is not comparable in chemical resistance to the metal-organic film former bonding obtained with the metal fugitive ligand complexes described above. The metal-film former bonding obtained between the metal fugitive ligand complex and the ligands of the film former is described in detail infra.

It is thought that there is significant salt formation and also metal bonding obtained between the resin and polymer ligands and the metal-fugitive ligand complexing agent in the liquid aqueous coating compositions of the invention. Since suitable resins are relatively low molecular weight substances having substantial carboxyl functionality, it is thought that substantial metal bonding can be tolerated before insoluble resins are obtained. The formation of ammonium carboxylate salts has a solubilizing effect on the alkali soluble resins and thus off-sets somewhat the bonding obtained between resin carboxyl groups and metal ions. In addition, the emulsion polymerization emulsifiers associated with the polymer particles are thought to contribute substantially to the stability of the polymer under the salt forming and metal bonding conditions encountered during storage of the coating composition. The effects of the $NH_4^+/COO^-$ ratio, the nonionic emulsifier content and the resin:polymer ratio on the stability of various coating compositions of the invention is discussed supra and also applies here.

Although the organic film former components, i.e., the polymer and resin and certain metal-fugitive ligand complexes would probably be dispersible and/or soluble in various organic solvents, it is apparent that the degree of ionization obtained in aqueous media cannot readily be achieved with most organic solvents, including highly polar substances. It is particularly important that the metal-fugitive ligand complex does not precipitate from the liquid coating composition. The particular metal-fugitive ligand complexes suitable for the coating compositions of the invention are soluble in aqueous media. It has been found that less soluble, more stable metal containing complexes which do not readily ionize in aqueous media, do not support the extensive ligand transfer required during film formation, i.e., the neutral 2,4-pentane-dione complexes of zinc or copper.

The metal ions of the complexing agent are responsible for maintaining a substantial amount of the polymer and resin ligands of the film in a captive state, i.e., as captive ligands. The concept of captive ligands is discussed infra.

During the film forming process, i.e., after the coating composition is applied to a substrate and the fugitive cation of the resin cut, the fugitive ligand of the metal-fugitive ligand complex and the fugitive anion (i.e., acetate, formate, carbonate), if present, volatize; the metal ions then are able to form bonds with the polymer and resin ligands. That is, the fugitive cation and fugitive ligand and anion, if present, of the metal-fugitive ligand complex and the fugitive cation of the resin escape, allowing the metal ions to undergo ligand transfer with the organic film former ligands. Thus, the metal ions transfer from the escaping fugitive ligand to the available ligands of the resin and/or polymer in the coating compositions. This metal-film former (carboxyl) bonding results in a film having a substantial amount of the carboxyl content tied up in the form of metal-carboxyl bonds. In this condition, these ligands are defined as captive for the purposes of the invention.

In the coating compositions of the invention the particular polymer and resin components of the coating composition and in some instances, the excess ammonia and nonionic emulsifier, if present, effectively maintain the composition in a stable condition, i.e., free from substantial metal bonding. Therefore, the bonding necessary for forming the films of the invention occurs only upon release of the various fugitive components of the coating composition.

The concentration of metal-fugitive ligand complex in the coating composition is preferably expressed as the ratio of metal ions to organic film former ligand equivalents (moles of metal-fugitive ligand complex/equivalents of carboxyl groups). For example, the ratio of metal ions to organic film former ligand equivalents is from about 0.075 to about 0.50 and preferably from about 0.1 to about 0.2. A particularly preferred metal to carboxyl ratio is 0.15.

In addition to the organic film former and metal fugitive ligand complex, the coating compositions of the invention can contain additional substances which will contribute to various properties of the film. For example, various wax emulsions such as polyethylene wax emulsions can be included in the coating compositions to impart improved scratch and mar resistance properties to the film.

(D) *Stabilizing agent*

It has been found that the alkali soluble resins of the invention (in the form of a resin cut) are stable in the aqueous coating compositions. It is thought that at least some of the carboxyl groups of the resin tend to form bonds with the metal ion in the coating compositions of the invention and that the ability of these resins to form complexes is controlled, at least in part, by the acid number, the molecular structure, and the molecular weight of the resins. That is, with the alkali soluble resins of the invention, apparently there is a balance between metal-resin bonding and ammonium salt formation, so that when these resins are present in the alkaline aqueous coating compositions of the invention containing metal-fugitive ligand complex, they remain stable. For example, it has been observed that certain styrene/acrylic acid resins having acid numbers greater than about 200, e.g., about 226, are stable in the coating compositions of the invention at metal concentrations greater than about 0.1 mole of metal complex per total organic film former ligand equivalents ($M^{++}/COO^-$), at any resin to polymer weight ratio, without requiring the addition of other stabilizing agents as described below. It is thought that such high acid number styrene/acrylic acid resins are capable of forming stable complexes with the metal ions. However, it has been observed that certain addition-type resins which have acid numbers substantially less than about 200, e.g., about 160, and certain of the above described condensation resins such as rosin/maleic anhydride/polyol condensation resins are not stable in coating compositions of the invention which contain more than about 0.1 mole of metal complex per organic film former ligand equivalent; unless a stabilizing amount of ammonium hydroxide is present and/or the coating composition contains a stabilizing amount of a water soluble nonionic ethylene oxide condensate emulsifier; provided that the resin to polymer weight ratio in such a coating composition is less than about 50:50. Moreover, the coating compositions containing these lower acid number addition-type resins, and/or the condensation-type resins, at resin to polymer weight ratios greater than about 50:50, i.e., 70:30, require a stabilizing amount of aqueous ammonia, and a stabilizing amount of water soluble, nonionic ethylene oxide condensate emulsifier to produce a coating composition which will have suitable optical density properties, i.e., stability. It is thought that these lower acid number addition-type resins and the condensation-type resins are not capable of forming stable complexes with the metal ions at $M^{++}/COO^-$ concentrations greater than about 0.1 in the coating compositions of the invention in the absence of stabilizing amounts of ammonia and/or water soluble, nonionic ethylene oxide condensate emulsifier.

Therefore, for the purposes of the present invention a stabilizing agent is defined as aqueous ammonia and/or a water soluble, nonionic ethylene oxide condensate emulsifier in a combination and in a concentration sufficient to provide a change in optical density in the coating composition of the invention, under the conditions described above of less than about 0.1 with the proviso that the aqueous ammonia concentration is sufficient to provide an increase in the $NH_4^+/COO^-$ up to about 2.8 with the total $NH_4^+/COO^-$ of the coating composition being less than about 3.5. For the purposes of the present invention a water soluble, nonionic ethylene oxide condensate emulsifier is defined as an organo/ethylene oxide condensate containing from about 12 to about 100 moles of ethylene oxide per mole of condensate. Suitable water soluble, nonionic ethylene oxide condensate emulsifiers include: alkylphenoxypolyethoxyethanols having alkyl groups of about 7 to about 18 carbon atoms and from about 12 to about 100 or more ethylene oxide (ethoxy) groups, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing about 12 to about 100 or more moles of ethylene oxide with nonyl, dodecyl, tetradecyl, t-dodecyl, and the like mercaptans or with alkylthiophenols having alkyl groups of about 6 to 15 carbon atoms; ethylene oxide derivatives of long-chain carboxylic acids, such as lauric, myristic, palmitic, oleic, and the like or mixtures of acids such as found in tall oil containing from about 12 to about 100 moles of ethylene oxide per mole of condensate; analogous ethylene oxide condensates of long-chain alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing from about 12 to about 100 ethylene oxide units, etc.; block copolymers of ethylene oxide and propylene oxide comprising a hydrophobic propylene oxide section combined with one or more hydrophilic ethylene oxide sections. Suitable water soluble, nonionic ethylene oxide condensate emulsifiers available commercially include:

(a) Triton X–165, X–205, X–305 and X–405 (which are octyl phenyl polyethoxy ethanols containing about 16, about 20, about 30 and about 40 moles of ethylene oxide per octyl phenyl moiety respectively).

(b) Makon 12, 14, 16, 20, and 30 which are alkyl phenoxy polyoxyethylene ethanols containing 12, 14; 16, 20, and 30 moles of ethylene oxide per alkyl phenoxy moiety respectively.

(c) Tergitol NP–33, 35, 40, and 44 which are nonylphenol/ethylene oxide condensates containing 13, 15, 20, and 40 moles respectively of ethylene oxide per nonylpenol moiety; and Tergitol 12–P–12 and 15–S–13 which are dodecylphenol/ethylene oxide and a secondary alcohol/ethylene oxide condensates containing 12 and 13 moles of ethylene oxide per mole of condensate.

(d) Siponic L, Y and E nonionic surfactants including Siponic L–12 and L–25 which are lauryl alcohol/ethylene oxide condensates containing about 12 and about 25 moles of ethylene oxide per mole of condensate respectively. Siponic E–10 and E–15 which are stearylcetyl alcohol/ethylene oxide condensates containing 20 and 30 moles respectively of ethylene oxide per mole of condensate; and Siponic Y–150, Y–501 and Y–500 which are oleyl alcohol/ethylene oxide condensates containing 15, 20 and 25 moles of ethylene oxide per mole of emulsifier.

(e) Sipenol 1C, 1T and 1S emulsifiers which are ethoxylated amines of coco, tallow, and stearyl respectively including Sipenol 1C–15 (15 moles of ethylene oxide), Sipenol 1T–15 (15 moles of ethylene oxide), Sipenol 1S–15 (15 moles of ethylene oxide), and Sipenol 1S–50 (50 moles of ethylene oxide).

If an emulsifier is employed as a stabilizing agent, it is essential that it be nonionic, i.e., free from charged groups and that it be water soluble, i.e., contain at least about 12 moles of ethylene oxide per mole of condensate. For example, when an octyl phenyl polyethoxy ethanol containing 6 moles of ethylene oxide per octyl phenyl moiety which is substantially water insoluble is used in certain coating compositions of the invention, it fails to provide a stabilizing effect similar to that obtained in the same coating composition with a related emulsifier, which is water soluble, i.e., containing 14 moles of ethylene oxide per octyl phenyl moiety. Particularly preferred nonionic emulsifiers include Triton X–405 and Makon 14.

The influence of aqueous ammonia on the stability of the coating compositions of the invention has been noted above. That is, the stability of certain coating compositions of the invention can be improved by increasing $NH_4^+/COO^-$ (equivalents of ammonium to total ligand equivalents). It has been found that in the coating compositions of the invention this ratio will range from about 0.7 to about 3.5.

Of course, it is understood that certain coating compositions of the invention will require both water soluble, nonionic emulsifier and aqueous ammonia in order to be considered stable as that term is defined herein. Moreover, it is further evident from the results set forth in Tables III and IV below that a stabilizing amount of a stabilizing agent such as aqueous ammonia and/or water soluble nonionic emulsifier can range from a $NH_4^+/COO^-$ of about 0.0 to about 1.3 (this is in addition to the $NH_4^+/COO^-$ of the composition before the stabilizing agent is added) and from about 0 to about 6% by weight nonionic emulsifier. It has been found that the total $NH_4^+/COO^-$ ratio of the composition can be up to about 3.5 or an increase of up to about 2.8 and that the maximum concentration of water soluble, nonionic ethylene oxide condensate emulsifier required is up to about 8%.

The effect of increasing metal concentration changing resin acid number, varying resin type, altering the resin to polymer ratio, altering $NH_4^+/COO^-$ and the influence of nonionic emulsifier in the coating compositions of the invention is illustrated in Tables III and IV below.

A polymer comprising 60% methylmethacrylate/31% 2-ethylhexylacrylate/9% methacrylic acid was used in the compositions described in Examples 1–36 in Table III. A polymer comprising 38% methyl methacrylate/53% 2-ethylhexylacrylate/9% methacrylic acid was used in the compositions described in Examples 37–168 in Table IV.

These various coating compositions described in Table IV were applied to black vinyl tile by hand using a soaked cheesecloth. The "Single Coat Resistance" of these films after aging for 72 hours at ambient conditions was observed using a Gardner Straight Line Washability and Abrasion Machine, model M–105–A (see Table IV below). The treated tile was subjected to 25 cycles with the Gardner machine using a felt pad soaked with an aqueous solution containing a commercially available cleaning powder (Cleaning Solution 1). The test was repeated on a second tile using a dilute solution of a commercially available household detergent (Cleaning Solution 2). The cleaning process using Cleaning Solution 1 was designed to simulate the most extreme household cleaning conditions. For example, the commercially available cleaning powder is considered to be one of the most effective cleaners commercially available. The cleaning powder contains trisodium phosphate, sodium carbonate, and dodecyl benzene sulfonate. The powder was diluted to about 1.25% solids.

Multiple coats of the various formulations were also applied to a black vinyl tile in a manner similar to that described above for obtaining the single coat resistance data. After each coating application the film was allowed to dry for about 24 hours at about 45° C. Five coatings were applied. Twenty-four hours after the fifth coating application the coated vinyl tile was treated with the Gardner machine in the manner described above under the single coat resistance discussion, except that a brush was substituted for the felt pad and 50 cycles were used rather than 25. The "Multiple Coat Removal" data obtained is set forth in Table IV below. Cleaning Solution 1, described above, was used for multiple coat removal, however, about three parts by weight of concentrated ammonium hydroxide (28% by weight $NH_3$) (complexing agent/alkaline aqueous medium) was added per 100 parts of the cleaning solution. Other alkaline aqueous complexing agents have also been used such as solutions of sodium hydroxide and tetramethylammonium hydroxide. The "Single Coat Resistance" and "Multiple Coat Removal" values are subjective, where ten equals complete resistance of the film to the treating solution and one equals complete removal of the film by the treating solution.

The various addition-type resins studied are listed in Tables III and IV in abbreviated form with the percent by weight of each monomer component listed immediately prior to the monomer abbreviation. The abbreviations are: 2EHA=2-ethylhexyl acrylate, EA=ethyl acrylate, S=styrene, AA=acrylic acid, VT=vinyl toluene and NV2P=N-vinyl-2-pyrrolidone.

The relationship between ammonia, carboxyl $$(NH_4^+/COO^-)$$

and pH for various compositions of the invention is evident from Table III. That is, a pH of about 8.5 is approximately equivalent to a $NH_4^+/COO^-$ of about 0.8, a pH of about 9.0 is approximately equivalent to a $NH_4^+/COO^-$ of about 1 and a pH of about 9.7 is approximately equivalent to a $NH_4^+/COO^-$ of about 2.

TABLE III

| Example No. | Resin | Resin:Polymer (Wt. Ratio) | $Zn^{++}/COO^-$ [a] | $NH_4^+/COO^-$ [b] | pH [c] | Nonionic Emulsifier [d] (Wt. Percent) T [e] | Nonionic Emulsifier [d] (Wt. Percent) M [f] | Stability [g] |
|---|---|---|---|---|---|---|---|---|
| 1 | Durez 15546 | 40:60 | 0.1 | 0.8 | 8.41 | | | 0.020 |
| 2 | do | 40:60 | 0.2 | 0.8 | 8.70 | | | 0.033 |
| 3 | do | 70:30 | 0.1 | 0.8 | 8.33 | | | 0.029 |
| 4 | do | 70:30 | 0.2 | 1.0 | 9.05 | | | Gel |
| 5 | do | 70:30 | 0.2 | 1.0 | 9.02 | 3 | | 0.286 |
| 6 | do | 70:30 | 0.2 | 1.0 | 9.03 | 6 | | 0.041 |
| 7 | do | 70:30 | 0.2 | 2.0 | 9.55 | 3 | | Gel |
| 8 | do | 70:30 | 0.2 | 2.0 | 9.59 | 6 | | 0.007 |
| 9 | Durez 19788 | 40:60 | 0.1 | 0.7 | 7.92 | | | 0.012 |
| 10 | do | 40:60 | 0.2 | 0.7 | | | | Gel |
| 11 | do | 40:60 | 0.2 | 0.7 | 8.46 | 6 | | 0.022 |
| 12 | do | 40:60 | 0.2 | 1.0 | 8.94 | | | Gel |
| 13 | do | 40:60 | 0.2 | 2.0 | 9.70 | | | −0.001 |
| 14 | do | 70:30 | 0.1 | 0.8 | 8.16 | | | 0.008 |
| 15 | do | 70:30 | 0.2 | 1.0 | | | | Gel |
| 16 | do | 70:30 | 0.2 | 2.0 | 9.65 | | | Gel |
| 17 | do | 70:30 | 0.2 | 2.0 | 9.70 | 3 | | −0.004 |
| 18 | do | 70:30 | 0.2 | 2.0 | 9.70 | | 3 | 0.008 |
| 19 | 68 S/32 AA (Acid No.=160, Mol. wt.=1,670). | 40:60 | 0.1 | 0.8 | 8.58 | | | 0.069 |
| 20 | do | 40:60 | 0.1 | 1.0 | 8.79 | | | −0.014 |
| 21 | do | 40:60 | 0.2 | 0.8 | 8.88 | | | 0.107 |
| 22 | do | 40:60 | 0.2 | 1.0 | 9.20 | | | 0.092 |
| 23 | do | 70:30 | 0.1 | 0.8 | 8.55 | | | 0.162 |
| 24 | do | 70:30 | 0.1 | 1.0 | 9.20 | | | 0.098 |
| 25 | do | 70:30 | 0.1 | 1.0 | 9.21 | 3 | | 0.069 |
| 26 | do | 70:30 | 0.1 | 2.0 | 9.70 | | | −0.016 |
| 27 | do | 70:30 | 0.2 | 1.0 | 9.24 | | | 0.217 |
| 28 | do | 70:30 | 0.2 | 1.0 | 9.20 | 6 | | 0.167 |
| 29 | do | 70:30 | 0.2 | 2.0 | 9.65 | 6 | | 0.085 |
| 30 | do | 70:30 | 0.2 | 2.0 | 9.61 | | 3 | 0.089 |
| 31 | 59 S/41 AA (Acid No.=226, Mol. wt.=2,140). | 40:60 | 0.1 | 0.7 | 8.66 | | | 0.013 |
| 32 | do | 40:60 | 0.2 | 0.7 | 8.90 | | | 0.038 |
| 33 | do | 70:30 | 0.1 | 0.9 | 9.02 | | | 0.011 |
| 34 | do | 70:30 | 0.2 | 0.9 | 9.13 | | | 0.030 |
| 35 | do | 70:30 | 0.2 | 1.1 | 9.30 | | | 0.020 |
| 36 | do | 70:30 | 0.2 | 1.1 | 9.30 | | 3 | 0.007 |

[a] Moles of zinc complex to carboxyl equivalents.
[b] Does not include the moles of $NH_3$ present in the zinc complex, $Zn(NH_3)_4^{++}$.
[c] Final pH of coating composition.
[d] Based on percent by weight of resin and polymer.
[e] T is Triton X-405.
[f] M is Makon 14.
[g] Change in optical density after seven days at 51° C.

TABLE IV

| Example No. | Resin | Resin:Polymer (Wt. Ratio) | $Zn^{++}/COO^-$ [e] | $NH_4^+/COO^-$ [f] | Nonionic Emulsifier [g] (Wt. Percent) | Stability [h] | S.C.R. [i] #1 [j] | S.C.R. [i] #2 [k] | M.C.R. [l] |
|---|---|---|---|---|---|---|---|---|---|
| 37 | 58 S/42 AA[a] (Acid No.=226, Mol. wt.=1,460). | 40:60 | 0.10 | 0.80 | | −0.008 | 6.00 | 9.25 | 1.0 |
| 38 | do | 40:60 | 0.10 | 0.80 | 6 | −0.007 | 2.50 | 7.00 | 1.0 |
| 39 | do | 40:60 | 0.10 | 1.00 | | −0.009 | 5.00 | 9.25 | |
| 40 | do | 40:60 | 0.20 | 0.80 | | 0.011 | 8.00 | 9.50 | |
| 41 | do | 40:60 | 0.20 | 0.80 | 6 | 0.006 | 7.00 | 9.75 | |
| 42 | do | 40:60 | 0.20 | 2.00 | | −0.007 | 9.00 | 9.75 | 1.0 |
| 43 | do | 40:60 | 0.20 | 2.00 | 6 | −0.009 | 7.00 | 9.75 | 1.0 |
| 44 | do | 40:60 | 0.30 | 2.00 | | 0.132 | 9.50 | 9.50 | |
| 45 | do | 40:60 | 0.30 | 2.00 | 6 | 0.005 | 9.00 | 10.00 | |
| 46 | do | 70:30 | 0.10 | 0.86 | | 0.018 | 7.00 | 9.50 | |
| 47 | do | 70:30 | 0.10 | 0.86 | 6 | 0.017 | 8.00 | 10.00 | |
| 48 | do | 70:30 | 0.10 | 1.00 | | −0.003 | 7.00 | 9.50 | 1.0 |
| 49 | do | 70:30 | 0.10 | 1.00 | 6 | −0.006 | 5.00 | 9.25 | 1.0 |
| 50 | do | 70:30 | 0.20 | 0.86 | | 0.054 | 9.75 | 9.50 | |
| 51 | do | 70:30 | 0.20 | 0.86 | 6 | 0.046 | 9.00 | 10.00 | |
| 52 | do | 70:30 | 0.20 | 2.00 | | −0.014 | 9.00 | 9.75 | 1.0 |
| 53 | do | 70:30 | 0.30 | 2.00 | 6 | −0.007 | 9.00 | 9.50 | 1.0 |
| 54 | do | 70:30 | 0.30 | 2.00 | | Gel | 9.00 | 9.25 | |
| 55 | do | 70:30 | 0.30 | 2.00 | 6 | 0.350 | 9.00 | 9.75 | |

See footnotes at end of table.

TABLE IV—Continued

| Example No. | Resin | Resin:Polymer (Wt. Ratio) | Zn++/COO- e | NH4+/COO- f | Nonionic Emulsifier g (Wt. Percent) | Stability h | S.C.R.i #1j | S.C.R.i #2k | M.C.R.l |
|---|---|---|---|---|---|---|---|---|---|
| 56 | 57 S/10 2EHA/33 AAa (Acid No.=160.5, Mol. wt.=1,400). | 40:60 | 0.10 | 0.80 | | −0.028 | 7.75 | 9.50 | 2.0 |
| 57 | do | 40:60 | 0.10 | 0.80 | 6 | −0.025 | 3.00 | 10.00 | 2.5 |
| 58 | do | 40:60 | 0.10 | 1.00 | | −0.042 | 7.50 | 9.50 | |
| 59 | do | 40:60 | 0.20 | 0.80 | | −0.041 | 10.00 | 9.75 | |
| 60 | do | 40:60 | 0.20 | 0.80 | 6 | −0.022 | 7.25 | 10.00 | |
| 61 | do | 40:60 | 0.20 | 2.00 | | −0.054 | 10.00 | 10.00 | 2.5 |
| 62 | do | 40:60 | 0.20 | 2.00 | 6 | −0.045 | 10.00 | 10.00 | 2.0 |
| 63 | do | 40:60 | 0.30 | 2.00 | | −0.040 | 10.00 | 10.00 | |
| 64 | do | 40:60 | 0.30 | 2.00 | 6 | −0.048 | 9.75 | 10.00 | |
| 65 | do | 70:30 | 0.10 | 0.82 | | −0.035 | 10.00 | 10.00 | |
| 66 | do | 70:30 | 0.10 | 0.82 | 6 | −0.034 | 6.50 | 10.00 | |
| 67 | do | 70:30 | 0.10 | 1.00 | | −0.054 | 9.50 | 10.00 | 1.5 |
| 68 | do | 70:30 | 0.10 | 1.00 | 6 | −0.048 | 7.25 | 10.00 | 1.5 |
| 69 | do | 70:30 | 0.20 | 0.82 | | −0.021 | 9.50 | 10.00 | |
| 70 | do | 70:30 | 0.20 | 0.82 | 6 | −0.019 | 8.50 | 10.00 | |
| 71 | do | 70:30 | 0.20 | 2.00 | | −0.087 | 10.00 | 10.00 | 2.0 |
| 72 | do | 70:30 | 0.20 | 2.00 | 6 | −0.075 | 9.50 | 10.00 | 1.5 |
| 73 | do | 70:30 | 0.30 | 2.00 | | Gel | | | |
| 74 | do | 70:30 | 0.30 | 2.00 | 6 | Gel | | | |
| 75 | 57 S/10 EA/33 AAa (Acid No.=174, Mol. wt.=1,200). | 40:60 | 0.10 | 0.80 | | −0.020 | 9.00 | 100.00 | |
| 76 | do | 40:60 | 0.10 | 0.80 | 6 | −0.008 | 2.50 | 9.75 | |
| 77 | do | 40:60 | 0.20 | 0.80 | | −0.002 | 9.25 | 10.00 | |
| 78 | do | 40:60 | 0.20 | 0.80 | 6 | −0.005 | 9.25 | 10.00 | |
| 79 | do | 40:60 | 0.20 | 2.00 | | −0.029 | 9.25 | 10.00 | |
| 80 | do | 40:60 | 0.20 | 2.00 | 6 | −0.022 | 9.00 | 10.00 | |
| 81 | do | 40:60 | 0.30 | 2.00 | | +0.001 | 10.00 | 10.00 | |
| 82 | do | 40:60 | 0.30 | 2.00 | 6 | −0.023 | 10.00 | 10.00 | |
| 83 | do | 70:30 | 0.10 | 0.83 | | +0.027 | 8.50 | 10.00 | |
| 84 | do | 70:30 | 0.10 | 0.83 | 6 | +0.047 | 5.00 | 9.50 | |
| 85 | do | 70:30 | 0.20 | 0.83 | | +0.129 | 10.00 | 10.00 | |
| 86 | do | 70:30 | 0.20 | 0.83 | 6 | +0.154 | 9.75 | 10.00 | |
| 87 | do | 70:30 | 0.20 | 2.00 | | −0.035 | 10.00 | 10.00 | |
| 88 | do | 70:30 | 0.20 | 2.00 | 6 | −0.018 | 9.62 | 10.00 | |
| 89 | do | 70:30 | 0.30 | 2.00 | 6 | Gel | 10.00 | 10.00 | |
| 90 | 58 VT/42 AAa (Acid No.=203, Mol. wt.=1,250). | 40:60 | 0.20 | 0.80 | | −0.003 | 10.00 | 10.00 | |
| 91 | do | 40:60 | 0.20 | 0.80 | 6 | −0.035 | 10.00 | 10.00 | |
| 92 | do | 40:60 | 0.20 | 2.00 | 6 | −0.052 | 10.00 | 10.00 | |
| 93 | do | 70:30 | 0.20 | 0.85 | | +0.013 | 10.00 | 10.00 | |
| 94 | do | 70:30 | 0.20 | 0.85 | 6 | +0.013 | 10.00 | 10.00 | |
| 95 | do | 70:30 | 0.20 | 2.00 | | −0.037 | 10.00 | 10.00 | |
| 96 | do | 70:30 | 0.20 | 2.00 | 6 | −0.037 | 10.00 | 10.00 | |
| 97 | 56 S/44 AAb (Acid No.=246, Mol. wt.=2,400). | 40:60 | 0.20 | 0.80 | | −0.019 | 9.75 | 10.00 | |
| 98 | do | 40:60 | 0.20 | 0.80 | 6 | −0.016 | 8.00 | 10.00 | |
| 99 | do | 40:60 | 0.20 | 2.00 | 6 | −0.027 | 9.50 | 10.00 | |
| 100 | do | 70:30 | 0.20 | 0.86 | | −0.008 | 10.00 | 10.00 | |
| 101 | do | 70:30 | 0.20 | 0.86 | 6 | −0.011 | 9.50 | 10.00 | |
| 102 | do | 70:30 | 0.20 | 2.00 | | −0.020 | 10.00 | 10.00 | |
| 103 | do | 70:30 | 0.20 | 2.00 | 6 | −0.020 | 10.00 | 10.00 | |
| 104 | 57 S/10 NV2P/33 AAb (Acid No.=191, Mol. wt.=1,450). | 40:60 | 0.20 | 0.80 | | −0.002 | 8.50 | 10.00 | |
| 105 | do | 40:60 | 0.20 | 0.80 | 6 | +0.001 | 4.50 | 9.50 | |
| 106 | do | 40:60 | 0.20 | 2.00 | 6 | −0.008 | 6.00 | 10.00 | |
| 107 | do | 70:30 | 0.20 | 0.86 | | +0.010 | 10.00 | 10.00 | |
| 108 | do | 70:30 | 0.20 | 0.86 | 6 | +0.008 | 10.00 | 10.00 | |
| 109 | do | 70:30 | 0.20 | 2.00 | | −0.003 | 10.00 | 10.00 | |
| 110 | do | 70:30 | 0.20 | 2.00 | 6 | 0.000 | 10.00 | 10.00 | |
| 111 | 68 S/32 AAd (Acid No.=160, Mol. wt.=1,400). | 40:60 | 0.10 | 0.80 | | −0.001 | 10.00 | 10.00 | |
| 112 | do | 40:60 | 0.10 | 0.80 | 6 | −0.005 | 7.00 | 9.50 | |
| 113 | do | 40:60 | 0.20 | 0.80 | | +0.121 | 10.00 | 10.00 | |
| 114 | do | 40:60 | 0.20 | 0.80 | 6 | +0.030 | 10.00 | 10.00 | |
| 115 | do | 40:60 | 0.20 | 2.00 | | −0.025 | 10.00 | 10.00 | |
| 116 | do | 40:60 | 0.20 | 2.00 | 6 | −0.018 | 10.00 | 10.00 | |
| 117 | do | 40:60 | 0.30 | 2.00 | | −0.001 | 10.00 | 10.00 | |
| 118 | do | 40:60 | 0.30 | 2.00 | 6 | −0.004 | 10.00 | 10.00 | |
| 119 | do | 70:30 | 0.10 | 0.91 | | −0.048 | 10.00 | 10.00 | |
| 120 | do | 70:30 | 0.10 | 0.91 | 6 | +0.020 | 9.50 | 10.00 | |
| 121 | do | 70:30 | 0.20 | 0.91 | | +0.021 | 10.00 | 10.00 | |
| 122 | do | 70:30 | 0.20 | 0.91 | 6 | +0.018 | 10.00 | 10.00 | |
| 123 | do | 70:30 | 0.20 | 2.00 | | −0.014 | 10.00 | 10.00 | |
| 124 | do | 70:30 | 0.20 | 2.00 | 6 | −0.013 | 10.00 | 10.00 | |
| 125 | do | 70:30 | 0.30 | 2.00 | | Gel | 10.00 | 10.00 | |
| 126 | do | 70:30 | 0.30 | 2.00 | 6 | Gel | 10.00 | 10.00 | |
| 127 | Durez 15546 | 40:60 | 0.10 | 0.80 | | +0.017 | 9.50 | 10.00 | 1.5 |
| 128 | do | 40:60 | 0.10 | 0.80 | 6 | +0.015 | 6.00 | 9.75 | 1.5 |
| 129 | do | 40:60 | 0.10 | 1.00 | | +0.013 | 9.00 | 10.00 | |
| 130 | do | 40:60 | 0.20 | 0.80 | | +0.019 | 10.00 | 10.00 | |
| 131 | do | 40:60 | 0.20 | 0.80 | 6 | +0.013 | 9.50 | 10.00 | |
| 132 | do | 40:60 | 0.20 | 2.00 | | +0.011 | 9.75 | 10.00 | 3.5 |
| 133 | do | 40:60 | 0.20 | 2.00 | 6 | +0.015 | 9.25 | 10.00 | 2.0 |
| 134 | do | 40:60 | 0.30 | 2.00 | | Gel | | | |
| 135 | do | 40:60 | 0.30 | 2.00 | 6 | +0.059 | 9.50 | 10.00 | |
| 136 | do | 70:30 | 0.10 | 0.80 | | +0.011 | 9.50 | 10.00 | |
| 137 | do | 70:30 | 0.10 | 0.80 | 6 | −0.014 | 8.00 | 10.00 | |
| 138 | do | 70:30 | 0.10 | 1.00 | | +0.016 | 9.25 | 10.00 | 1.0 |
| 139 | do | 70:30 | 0.10 | 1.00 | 6 | +0.022 | 9.00 | 10.00 | 1.0 |
| 140 | do | 70:30 | 0.20 | 0.80 | | Gel | | | |
| 141 | do | 70:30 | 0.20 | 0.80 | 6 | +0.063 | 9.50 | 10.00 | |
| 142 | do | 70:30 | 0.20 | 2.00 | | Gel | | | |
| 143 | do | 70:30 | 0.20 | 2.00 | 6 | 0.000 | 10.00 | 10.00 | 1.0 |
| 144 | do | 70:30 | 0.30 | 2.00 | | Gel | | | |
| 145 | do | 70:30 | 0.30 | 2.00 | 6 | Gel | | | |
| 146 | Schenectady SR-83 | 40:60 | 0.10 | 0.80 | | +0.003 | 8.50 | 10.00 | 1.0 |
| 147 | do | 40:60 | 0.10 | 0.80 | 6 | +0.004 | 8.50 | 10.00 | 1.0 |
| 148 | do | 40:60 | 0.20 | 0.80 | | +0.014 | 9.25 | 10.00 | |
| 149 | do | 40:60 | 0.20 | 0.80 | 6 | +0.005 | 9.00 | 10.00 | |

See footnotes at end of table.

TABLE IV—Continued

| Example No. | Resin | Resin:Polymer (Wt. Ratio) | $Zn^{++}/COO^-$ [e] | $NH_4^+/COO^-$ [f] | Nonionic Emulsifier [g] (Wt. Percent) | Stability [h] | S.C.R. [i] #1 [j] | S.C.R. [i] #2 [k] | M.C.R. [l] |
|---|---|---|---|---|---|---|---|---|---|
| 150 | Schenectady SR-83 | 40:60 | 0.20 | 2.00 | ------ | −0.001 | 8.75 | 10.00 | 1.0 |
| 151 | ----do---- | 40:60 | 0.20 | 2.00 | 6 | −0.004 | 8.00 | 10.00 | 1.0 |
| 152 | ----do---- | 40:60 | 0.30 | 2.00 | ------ | Gel | ------ | ------ | ------ |
| 153 | ----do---- | 40:60 | 0.30 | 2.00 | 6 | +0.050 | 9.75 | 10.00 | ------ |
| 154 | ----do---- | 70:30 | 0.10 | 0.80 | ------ | Gel | 9.75 | 10.00 | 1.0 |
| 155 | ----do---- | 70:30 | 0.10 | 0.80 | 6 | +0.005 | 7.75 | 10.00 | 1.0 |
| 156 | ----do---- | 70:30 | 0.20 | 0.80 | ------ | Gel | ------ | ------ | ------ |
| 157 | ----do---- | 70:30 | 0.20 | 0.80 | 6 | Gel | 9.50 | 10.00 | ------ |
| 158 | ----do---- | 70:30 | 0.20 | 2.00 | ------ | Gel | 9.25 | 10.00 | ------ |
| 159 | ----do---- | 70:30 | 0.20 | 2.00 | 6 | −0.006 | 9.75 | 10.00 | 1.0 |
| 160 | ----do---- | 70:30 | 0.30 | 2.00 | ------ | Gel | ------ | ------ | ------ |
| 161 | ----do---- | 70:30 | 0.30 | 2.00 | 6 | Gel | ------ | ------ | ------ |
| 162 | Shanco L-11658 | 40:60 | 0.20 | 0.80 | ------ | 0.198 | 9.50 | 10.00 | ------ |
| 163 | ----do---- | 40:60 | 0.20 | 0.80 | 6 | −0.075 | 9.00 | 9.50 | ------ |
| 164 | ----do---- | 40:60 | 0.20 | 2.00 | 6 | −0.082 | 9.00 | 9.50 | ------ |
| 165 | ----do---- | 70:30 | 0.20 | 0.82 | ------ | Gel | ------ | ------ | ------ |
| 166 | ----do---- | 70:30 | 0.20 | 0.82 | 6 | Gel | 9.62 | 9.75 | ------ |
| 167 | ----do---- | 70:30 | 0.20 | 2.00 | ------ | Gel | 9.75 | 10.00 | ------ |
| 168 | ----do---- | 70:30 | 0.20 | 2.00 | 6 | +0.046 | 9.62 | 10.00 | ------ |

[a] Prepared with 5 mole percent benzoyl peroxide catalyst.
[b] Prepared with 2 mole percent benzoyl peroxide catalyst.
[c] Prepared with 1 mole percent benzoyl peroxide catalyst.
[d] Prepared with 5 mole percent azo-bis-isobutyronitrile catalyst.
[e] Moles of zinc complex to carboxyl equivalents.
[f] Does not include moles of $NH_3$ present in zinc complex $Zn(NH_3)_i^{++}$.
[g] Triton X-405 (percent by weight based on resin and polymer).
[h] Change in optical density after seven days at 51° C.
[i] Single coat resistance.
[j] Cleaning Solution #1.
[k] Cleaning Solution #2.
[l] Multiple coat removal.

In addition to the organic film former, aqueous ammonia, metal-fugitive ligand complexing agent and stabilizing agent the coating compositions of the invention can contain conventional film supplements, particularly if these compositions are used as temporary floor coatings. For example, these compositions can contain from 0.1 to about 3% of a wax such as polyethylene wax (i.e., as solid wax), from about 0.5 to about 3% of glycols such as ethylene glycol, propylene glycol and mixtures thereof, from about 0.001 to about 1% fatty acid soaps such as tall oil fatty acid/di-ethylaminoethanol soap or oleic acid/morpholine soap and other film supplements such as tris-(butoxyethyl) phosphate in concentrations up to about 1%. It is understood that these percentages are based on the total weight of the composition.

The wax employed in certain coating compositions of the invention can be a natural or synthetic substance or mixtures thereof. The wax is usually added to the composition in the form of an emulsion. Typical wax emulsions suitable in the compositions of the invention containing a commercially available wax include the following:

| Component: | Parts |
|---|---|
| Polyethylene wax, AC 629 | 155.60 |
| Tall oil fatty acid | 15.60 |
| Diethylamino ethanol | 18.12 |
| Deionized water | 664.97 |
| Formaldehyde (37% solution) | 1.71 |
| | 856.00 |

| Component: | |
|---|---|
| Epolene E-10, polyethylene wax | 40.00 |
| Oleic acid | 7.00 |
| Morpholine | 5.00 |
| Deionized water | 183.00 |
| | 235.00 |

The above wax emulsions contain approximately 20% solids.

Film

The films of this invention contain captive ligands and have the unique properties of structural integrity and controlled removability. These films are comprised of:

(a) Polyligand emulsion polymers having MFT's of less than about 80° C., (b) Low molecular weight, polyligand, alkali soluble resins having acid numbers from about 120 to about 250, and (c) Metal ions, wherein the ratio of moles of metal ions to carboxyl ligand equivalents is from about 0.075 to about 0.5.

These metal-containing organic films of the invention have a unique property described herein as structural integrity which is evidenced by the unexpected and unobvious chemical resistance of these films. It is thought that during film formation the metal ions function as crosslinking agents and combine with ligands of the film former to form a crosslinked network. It is thought that the metal ions are bonded with the resin and polymer ligands by means of coordinate linkages which have some covalent character and are not completely electrostatic in nature. It is also thought that this metal-ligand bonding, i.e., the formation of captive ligands, provides the films of the invention with an integral barrier to the penetration of most solvents including water, detergent solutions, foodstuffs, and certain organic solvents.

The structural integrity of these films is evidenced by:

(a) The limited and regular distortion obtained under swelling or shrinking conditions (see Example 174) and (b) The swelling behavior of these films (see Example 174).

The structural integrity of these films is further unique in that in addition to the chemical resistance described above, these films have the unexpected and unobvious property of controlled removability. That is, these films are chemical sensitive in that the captive ligands of the film will undergo ligand displacement when treated with certain complexing agents contained in an alkaline medium. This ligand displacement results in film break-up. Subsequent removal of the film from a substrate can be readily achieved. Film removal is discussed below.

The ratio of metal ions to carboxyl ligand equivalents (moles of metal-fugitive ligand complex/equivalents of carboxyl groups) is an indication of the bonding efficiency of the metal when the films of the invention are formed. This ratio usually ranges from about 0.075 to about 0.5 and preferably from about 0.1 to about 0.2. This ratio, of course, is a measure of the carboxyl/ligand-metal bonding obtained and also suggests the concentration of complexing agent required to remove the film.

The hardness of the films of the invention has been observed and compared with a nonmetal-containing film and a film obtained from a conventional commercially available coating composition. The films of this invention exhibit improved resistance to indentation under a constant load. (See Example 175.)

It is understood that these coating compositions can be applied to numerous substrates by various methods including application with a rag, mop, brush and by spraying and/or dipping. The films of this invention have been obtained on a broad class of substrates ranging from metals and glass to wood and various synthetic substances. For example, the coating compositions of the invention have been applied as temporary protective coatings to metals such as steel, to various natural and synthetic surfaces including wood, linoleum, and vinyl asbestos, asphalt and vinyl tile. Further, these compositions have been used in permanent coatings such as paints and adhesives which have the unique advantage of controlled removability. Additionally, these coating compositions could be used as shellac and varnish-like coatings.

*Film removal*

The method of removing the metal-containing organic films of the invention comprises applying a complexing agent in an alkaline aqueous medium to the film. The alkaline complexing agent achieves displacement of the captive ligands and effects salt formation with at least some of the available film former ligands. It has been found that effective film removal is readily obtained with uni- and multi-layer films of the invention by the application of such alkaline complexing agents. Moreover, it has been observed that film removal can also be obtained with multi-layer films wherein at least some of the layers are comprised of the coating compositions of the invention and the remainder are comprised of conventional coating compositions.

Suitable complexing agents contain a ligand capable of achieving ligand displacement and include substances such as sodium hydroxide, ammonium hydroxide, and diethylenetriamine. The complexing agent, therefore, effects displacement of the captive ligand and provides a new ligand-metal group while the displaced film former ligands are substantially free from ligand bonding. Such captive ligand displacement is an equilibrium phenomenon and is influenced by parameters such as concentrations of the various constituents. Accordingly, an excess of the complexing agent and/or precipitation or solubilization of the resultant newly formed metal-ligand complex and/or removal of the film former ligands will shift the equilibrium in favor of film former ligand displacement and result in film break-up. Usually an excess of the alkaline complexing agent is used. The excess alkaline complexing agent provides a two-fold result. First, ligand displacement is shifted in favor of the newly formed ligand-metal complex. Secondly, the available film former ligands are converted to alkali or amine salts which assist in film removal.

In order to obtain the controlled removability properties of the film, it is essential that the film former be a polyligand substance. It is further necessary after captive ligand displacement that the polymer be dispersible in the alkaline complexing solution. This property is necessary in order to effectively remove the film from the substrate. That is, if a polymer is used which is not dispersible, a film containing the polymer is difficult to remove from a substrate since islands of such polymer tend to remain on the substrate.

Of course, the alkali soluble, low molecular weight polyligand resins of the film former provide a substantial amount of the ligands required for metal-ligand bonding. When an alkaline solution of complexing agent is applied to the film, ligand displacement and alkali-ligand salts are obtained. This salt formation, of course, influences the solubility of the resin in the alkaline complexing solution and assists in removing the film from the substrate.

Having described the invention in general terms, the following examples will more particularly illustrate preferred embodiments of the invention. Proportions are parts by weight unless expressly indicated otherwise.

EXAMPLE 169

A high molecular weight, polyligand, emulsion polymer containing methyl methacrylate, 47.5%; 2-ethylhexyl acrylate, 47.5%; and acrylic acid, 5%, was prepared as follows: 95 parts methyl methacrylate, 95 parts 2-ethylhexyl acrylate, and 10 parts acrylic acid were admixed in a suitable vessel. 358 parts deionized water, 20.7 parts of a 28% aqueous solution of sodium lauryl sulfate emulsifier, and 70 parts of the admixture of monomers were charged into a reaction flask. The flask was then flushed with nitrogen for 30 minutes before a catalyst mixture composed of one part $(NH_4)_2S_2O_8$ and one part $NaHSO_3$ was added. Heating of the reaction flask was begun. When the reaction mixture reached 30° C., addition of the remaining monomer charge was begun. The addition took 1¾ hours. During this time, the temperature was raised gradually to approximately 60° C. Then the temperature was raised to 90–92° C. and held at this temperature for 30 minutes before cooling. A stable emulsion polymer was obtained. The polymer had an MFT less than 20° C. The reaction product contained 35% solids.

EXAMPLE 170

A high molecular weight, polyligand, emulsion polymer containing methyl methacrylate, 60%; 2-ethylhexyl acrylate, 31%; methacrylic acid, 9%, was prepared in a method substantially similar to that described in Example 169 above.

A stable emulsion polymer was obtained. The polymer had an intrinsic viscosity at 25° C. in 2-butanone of 0.77 deciliters/gram which corresponds to an estimated viscosity average molecular weight of about 427,000, using the constants for polymethylmethacrylate polymer in 2-butanone at 25° C. The polymer had an MFT of 55° C. The reaction product contained 35% solids.

EXAMPLE 171

A series of polymers were prepared in a manner similar to that described in Example 169 and added to four different aqueous coating composition formulations (Formulations I, II, III, and IV which are described in detail below). These coating compositions also contained a resin, zinc oxide, leveling aids, plasticizers, emulsifiers, and other film supplements. The stability of these coating compositions was observed at about 51° C. after eight days. The increase in optical density for each composition was less than about 0.1. The $NH_4^+/COO^-$ ratio in each of these compositions was about 2.0.

These various coating compositions were applied to black vinyl tile by hand using a soaked cheesecloth. The "Single Coat Resistance" of these films after aging for 72 hours at ambient conditions was observed using a Gardner Straight Line Washability and Abrasion Machine as described above. The treated tile was subjected to 25 cycles with the Gardner machine using a felt pad soaked with an aqueous solution containing a commercially available cleaning powder (Cleaning Solution 1). The test was repeated on a second tile using a dilute solution of a commercially available household detergent (Cleaning Solution 2). The cleaning process using Cleaning Solution 1 was designed to simulate the most extreme household cleaning conditions. For example, the commercially available cleaning powder is considered to be one of the most effective cleaners commercially available. The cleaning powder contains trisodium phosphate, sodium carbonate, and dodecyl benzene sulfonate. The powder was diluted to about 1.25% solids.

Multiple coats of the various formulations were also applied to a black vinyl tile in a manner similar to that described above for obtaining the single coat resistance data. After each coating application the film was allowed to dry for about 24 hours at about 45° C. Five coatings were applied. Twenty-four hours after the fifth coating application the coated vinyl tile was treated with the Gardner machine in the manner described above under the single coat resistance discussion, except that a brush was substituted for the felt pad and 50 cycles were used rather than 25. The "Multiple Coat Removal" data obtained is set forth in Table V below. Cleaning Solution 1, described above, was used for a multiple coat removal; however, about three parts by weight of concentrated ammonium hydroxide (28% by weight $NH_3$) (complexing agent/alkaline aqueous medium) was added per 100 parts of the cleaning solution. Other alkaline aqueous complexing agents have also been used such as solutions of hydroxides including sodium and potassium hydroxide, tetramethylammonium hydroxide, and mixtures thereof, various amines such as diethylenetriamine, ethylamine, propylamine, ethylenediamine, methylamine, and mixtures thereof. Mixtures of complexing agents with detergents such as ammonium salicylate/detergent mixtures are also suitable. The "Single Coat Resistance" and "Multiple Coat Removal" values are subjective, where ten equals complete resistance of the film to the treating solution and one equals complete removal of the film by the treating solution.

The film appearance on drying at ambient conditions is also recorded in Table V. Unless the film is described as crazed, it was acceptable.

The various polymers studied are listed in Table V in abbreviated form with the percent by weight of each monomer component listed immediately prior to the monomer abbreviation. The abbreviations are MMA=methyl methacrylate, BuA=butyl acrylate, MAA=methacrylic acid, 2EHA=2-ethylhexyl acrylate, EA=ethyl acrylate, BuMA=butyl methacrylate, S=styrene, EMA=ethyl methacrylate.

The four formulations used contained the following:

*Formulation I*

| Component: | Parts |
|---|---|
| Deionized water | 136.39 |
| A resin cut containing 20.30% solids comprising a styrene/acrylic acid resin having a molecular weight of about 2,140 and an acid value of about 226 and having a pH of about 9.1 and a $NH_4^+/COO^-$ of about 1.03 | 52.86 |
| Triton X-405 | 2.65 |
| Tris-(butoxyethyl)phosphate | .90 |
| Propylene glycol | 5.00 |
| Polymer (about 35% solids) | 45.97 |
| Ammonium hydroxide (1.71 moles of $NH_3$ per 100.0 grams of ammonium hydroxide) | 5.75 |
| Zinc oxide ($Zn^{++}/COO^-$ of about 0.10) | .48 |
| | 250.00 |

The resin to polymer weight ratio was about 40:60. The coating composition contained about 12% solids and had a $NH_4^+/COO^-$ of about 2.0.

*Formulation II*

| Component: | Parts |
|---|---|
| Deionized water | 136.38 |
| A styrene/acrylic acid resin cut (as described in Formulation I) | 51.92 |
| Triton X-405 | 2.65 |
| Tris-(butoxyethyl)phosphate | .90 |
| Propylene glycol | 5.00 |
| Polymer (about 35% solids) | 45.17 |
| Ammonium hydroxide (as described in Formulation I above) | 7.03 |
| Zinc oxide ($Zn^{++}/COO^-$ of about 0.20) | .95 |
| | 250.00 |

The resin to polymer weight ratio was about 40:60. The coating composition contained about 12% solids and had a $NH_4^+/COO^-$ of about 2.0.

*Formulation III*

| Component: | Parts |
|---|---|
| Deionized water | 119.00 |
| A styrene/acrylic acid resin cut (as described in Formulation I above) | 91.77 |
| Triton X-405 | 2.65 |
| Tris-(butoxyethyl)phosphate | .90 |
| Propylene glycol | 5.00 |
| Polymer (about 35% solids) | 22.83 |
| Ammonium hydroxide (as described in Formulation I above) | 7.17 |
| Zinc oxide ($Zn^{++}/COO^-$ of about 0.10) | .68 |
| | 250.00 |

The resin to polymer weight ratio was about 70:30. The coating composition contained about 12% solids and had a $NH_4^+/COO^-$ of about 2.0.

*Formulation IV*

| Component: | Parts |
|---|---|
| Deionized water | 119.39 |
| A styrene/acrylic acid resin cut (as described in Formulation I above) | 89.60 |
| Triton X-405 | 2.65 |
| Tris-(butoxyethyl)phosphate | .90 |
| Propylene glycol | 5.00 |
| Polymer (about 35% solids) | 22.26 |
| Ammonium hydroxide (as described in Formulation I above) | 8.88 |
| Zinc oxide ($Zn^{++}/COO^-$ of about 0.20) | 1.32 |
| | 250.00 |

The resin to polymer weight ratio was about 70:30. The coating composition contained about 12% solids and had a $NH_4^+/COO^-$ of about 2.0.

The total nonvolatile concentration in each formulation was about 12%. Each formulation had a pH from about nine to about ten. The zinc metal was added to each in the form of ZnO and, as noted in the discussion of the complexing agent above, was dissolved in the resin cut, containing an excess of ammonia.

TABLE V

| Polymer | Formulation I S.C.R. #1 | Formulation I S.C.R. #2 | Formulation I M.C.R. | Formulation II S.C.R. #1 | Formulation II S.C.R. #2 | Formulation II M.C.R. | Formulation III S.C.R. #1 | Formulation III S.C.R. #2 | Formulation III M.C.R. | Formulation IV S.C.R. #1 | Formulation IV S.C.R. #2 | Formulation IV M.C.R. |
|---|---|---|---|---|---|---|---|---|---|---|---|---|
| 11 S/80 EMA/9 MAA | *7 | 10 | | *5 | fl. | | *9 | 10 | | *7.5 | 10 | |
| 71 S/20 BuA/9 MAA | *7 | 10 | | *6 | fl. | | *10 | 10 | | *7 | 10 | |
| 71 S/20 EA/9 MAA | *6 | 10 | | *5.5 | fl. | | *9.5 | 10 | | *7.5 | fl. | |
| 11 S/80 EA/9 MAA | 4.5 | | | 4 | | | 9.5 | | | 9 | | |
| 71 EA/20 BuMA/9 MAA | 7 | | | 4 | | | 9 | | | 9.5 | | |
| 11 EA/80 BuMA/9 MAA | 6 | | | 8 | | | 10 | | | 10 | | |
| 71 MMA/20 EA/9 MAA | *9 | 10 | | *7 | 10 | | *9.5 | 10 | | *8.5 | 10 | |
| 31 MMA/60 EA/9 MAA | 2.5 | | | 8 | | | 9.5 | | | 10 | | |
| 71 MMA/20 BuA/9 MAA | *9 | 10 | | *7 | fl. | | *10 | 10 | | *7.5 | 10 | |
| 71 MMA/20 2EHA/9 MAA | *9.5 | 10 | 1 | *6 | fl. | 1 | *9.5 | 10 | 1 | *8.5 | 10 | 1 |
| 11 MMA/80 2EHA/9 MAA | 6 | | 6 | 6 | | 3.5 | 8 | | 2 | 10 | | 2 |
| 51 MMA/40 2EHA/9 MMA | 8 | 10 | 4 | 9 | 10 | 1.5 | 9.5 | 10 | 1 | 10 | 10 | 1.5 |
| 55 MMA/40 2EHA/5 MAA | 4 | | 2 | 6 | | 1.5 | 6 | | 1 | 9 | | 1 |
| 45 MMA/40 2EHA/15 MAA | 9 | | 4 | 10 | | 1 | 10 | | 1 | 10 | | 1.5 |
| 40 MMA/40 2EHA/20 MAA | 5 | | 1.5 | 8 | | 1 | 10 | | 1 | 10 | | 1 |
| 60 MMA/40 2EHA | 3.5 | | 7 | 7 | | 7 | 10 | | 3 | 8.5 | | 3.5 |

S.C.R.=Single Coat Resistance. M.C.R.=Multiple Coat Removal. #1=Cleaning Solution #1. #2=Cleaning Solution #2. fl.=Flaked off. *=Crazed.

The effect of changing the $Zn^{++}/COO^-$ ratio and resin to polymer ratio is evidenced by the results obtained under "Single Coat Resistance" in Table V above.

It should be noted that those polymers which have a minimum film forming temperature greater than about 80° C. formed crazed films as shown above.

When a commercially available household detergent solution (Cleaning Solution 2) was used, "Single Coat Resistance" values for films obtained from the coating compositions of the invention were about ten.

The "Multiple Coat Removal" test was designed to show comparative ease in coating removal of aged built-up films. Therefore, complete film removal was not required. Complete removal of the films of the invention can be obtained if the test is continued. All the films of the invention tested under the "Single Coat Resistance" test were removed with a complexing agent/alkaline aqueous medium, i.e., the solution used in the "Multiple Coat Removal" test.

EXAMPLE 172

The following are formulations of coating compositions having various resin to polymer ratios and various metal ion to total carboxyl ratios:

(a) A coating composition having a resin to polymer weight ratio of 20:80 containing about 5.5% solids and having a $NH_4^+/COO^-$ of about 2.0 comprising:

| | Parts |
|---|---|
| Deionized water | 574.84 |
| A resin cut containing 19.71% solids comprising a styrene/acrylic acid resin having a molecular weight of about 2,470 and an acid value of about 207 and having a pH of about 8.21 | 30.44 |
| Triton X–405 | 1.27 |
| Tris-(butoxyethyl)phosphate | 0.60 |
| Makon 14 | 3.07 |
| Ethylene glycol | 4.07 |
| A polymer containing methyl methacrylate 51%/2-ethylhexyl acrylate 40%/methacrylic acid 9% (34.87% solids) | 68.83 |
| Ammonium hydroxide (about 1.74 moles ammonia per 100.0 grams ammonium hydroxide) | 4.15 |
| Tetrammine zinc (II) acetate (1.0 molar solution) ($Zn^{++}/COO^-$=about 0.5) | 25.27 |
| | 712.54 |

(b) A coating composition having a resin to polymer weight ratio of 30:70 containing about 12% solids and having a $NH_4^+/COO^-$ of about 1.0 comprising:

| | Parts |
|---|---|
| Deionized water | 135.71 |
| Styrene/acrylic acid resin cut [as described in (a) above] | 40.59 |
| Triton X–405 | 1.22 |
| Tris-(butoxyethyl)phosphate | 0.58 |
| Propylene glycol | 3.99 |
| A polymer [as described in (a) above] | 53.54 |
| Ammonium hydroxide [as described in (a) above] | 1.18 |
| Tetrammine zinc (II) acetate [as described in (a) above] ($Zn^{++}/COO^-$=about 0.1) | 5.27 |
| | 242.08 |

(c) A coating composition having a resin to polymer weight ratio of 90:10 containing about 14% solids and having a $NH_4^+/COO^-$ of about 3.0 comprising:

| | Parts |
|---|---|
| Deionized water | 60.90 |
| Styrene/acrylic acid resin cut [as described in (a) above] | 121.76 |
| Triton X–405 | 1.22 |
| Tris-(butoxyethyl)phosphate | 0.58 |
| Propylene glycol | 2.67 |
| Ethylene glycol | 1.33 |
| A polymer containing methyl methacrylate 30%/2-ethylhexyl acrylate 61%/methacrylic acid 9% (34.72% solids) | 7.70 |
| Ammonium hydroxide (as described above) | 10.90 |
| Hexammine nickel (II) acetate (1.0 molar solution) ($Ni^{++}/COO^-$=about 0.2) | 19.59 |
| | 226.65 |

EXAMPLE 173

The following are formulations of coating compositions containing mixtures of condensation-type and addition-type resins with various polymers and mixtures of polymers:

(a) A coating composition having a resin to polymer weight ratio of 40:60, containing approximately 14% solids and having a $NH_4^+/COO^-$ of about 2.0 comprising:

| | Parts |
|---|---|
| Deionized water | 89.95 |
| A resin cut containing 20.59% solids comprising a styrene/acrylic acid resin having a molecular weight of about 1,620 and an acid value of about 212, and having a pH of about 7.69 | 25.89 |
| A resin cut containing 19.99% solids comprising Durex 19788 resin and having a pH of about 8.02 | 26.66 |
| Tris-(butoxyethyl)phosphate | 0.67 |
| Ethylene glycol | 4.17 |
| A polymer containing methyl methacrylate 55%/butyl acrylate 40%/acrylic acid 5% (35.23% solids) | 45.39 |
| Ammonium hydroxide [as described in 172 (a)] | 3.59 |
| Tetrammine cadmium (II) acetate (1.0 molar solution) ($Cd^{++}/COO^-$=0.075) | 4.18 |
| | 200.50 |

(b) A coating composition having a resin to polymer weight ratio of 40:60 containing approximately 20% solids and having a $NH_4^+/COO^-$ of about 3.0 comprising:

| | Parts |
|---|---|
| Deionized water | 27.29 |
| A resin cut containing 19.99% solids comprising a styrene/acrylic acid resin having a molecular weight of about 1,400 and an acid value of 160 and having a pH of about 8.54 | 50.02 |
| Tris-(butoxyethyl)phosphate | 0.86 |
| Propylene glycol | 3.60 |
| Triton X–405 | 1.70 |
| A polymer containing ethyl methacrylate 80%/styrene 11%/methacrylic acid 9% (34.86% solids) | 17.21 |
| A polymer containing methyl methacrylate 30%/2-ethylhexyl acrylate 61%/methacrylic acid 9% (34.72% solids) | 25.92 |
| Ammonium hydroxide [as described in 172 (a) above] | 7.66 |
| Tetrammine copper (II) acetate (1.0 molar solution) ($Cu^{++}/COO^-$=0.20) | 9.59 |
| | 143.85 |

(c) A coating composition having a resin to polymer weight ratio of 35:65 containing approximately 10% solids and having a $NH_4^+/COO^-$ of about 2.0 comprising:

| | Parts |
|---|---|
| Deionized water | 175.12 |
| A styrene/acrylic acid resin cut [as described in Example 173 (b)] | 23.31 |
| Durez 19788 resin cut [as described in 173 (a)] | 23.31 |
| Tris-(butoxyethyl)phosphate | 0.80 |
| Ethylene glycol | 4.74 |
| A polymer containing ethyl methacrylate 80%/styrene 11%/methacrylic acid 9% (34.86% solids) | 24.81 |
| A polymer containing methyl methacrylate 38%/2-ethylhexyl acrylate 53%/methacrylic acid 9% (34.88% solids) | 24.80 |
| Ammonium hydroxide [as described in 172 (a) above] | 3.83 |
| Tetrammine copper (II) acetate (1.0 molar solution) ($Cu^{++}/COO^-=0.15$) | 7.78 |
| | 288.50 |

EXAMPLE 174

The resistance to solution of a zinc-containing film obtained from a coating composition described in detail below was observed along with the limited and regular distortion obtained under swelling and/or shrinking conditions. A similar film which did not contain zinc and films obtained from certain commercially available coating compositions (Commercial Products 1 and 2) were also observed under these conditions.

Small rectangular portions of each of these films were placed in a Petri dish. Initially the area of each film was established by means of a comparison microscope. Then each film was covered with solvent and the changes in surface area were monitored. Additional solvent was added as required to maintain a constant liquid level in the Petri dish.

The change in area of the film including swelling, shrinking, and dissolving and the distortion obtained with solvents having various solubility parameters is set forth in Table VI below.

The zinc-containing film was obtained from a coating composition similar to that described in Formulation II above, i.e., containing a $Zn^{++}/COO^-$ of about 0.20. Specifically, the coating contained:

| Component: | Parts |
|---|---|
| Deionized water and aqueous ammonia sufficient to adjust final pH to about 9.8 | 49.05 |
| A resin cut containing 19.22% solids comprising a styrene/acrylic acid resin having a molecular weight of about 2,140 and an acid number of about 226 and having a pH of about 8.8 | 36.40 |
| Ethylene glycol | 1.21 |
| Propylene glycol | 2.42 |
| Triton X-405 | 1.77 |
| Tris-(butoxyethyl)phosphate | 0.60 |
| Tetrammine zinc (II) acetate (0.5 molar solution) ($Zn^{++}/COO^-$ of about 0.20) | 17.18 |
| A polymer containing methyl methacrylate 46.5%/2-ethylhexyl acrylate 44.5%/methacrylic acid 9% (about 34.85% solids) | 36.70 |
| | 145.33 |

The resin to polymer weight ratio was about 35:65. The coating composition contained about 15% solids and had a pH of about 9.8.

The zinc-free film was obtained from a similar coating composition which did not contain the tetrammine zinc (II) acetate solution.

The zinc-containing film reached an equilibrium value in each solvent. Outlines of the film which initially were rectangular in each solvent became smoothly curved. Leaching of the surfactant from the film occurred with chloroform followed by detachment of unattached polymer. The film outlines, originally rectangular, became highly irregular during the initial swelling period but later healed to a regular shape with curved sides and maintained this shape and size.

TABLE VI.—CHANGE IN AREA IN PERCENT [a]

| | n-Heptane (solubility parameter 8.6) | Chloroform (solubility parameter 9.3) | Acetone (solubility parameter 10.0) |
|---|---|---|---|
| Zinc-containing | [b] 30.0 | [b] 242.55 | [b] 415 |
| Zinc-free | [b] 10.5 | [c] 43 | [c] 206 |
| Commercial Product No. 1 | [d] −2.7 | [c] 48 | [c] 148 |
| Commercial Product No. 2 | | [c] 3.0 | [c] 30 |

[a] The change in percent is either at equilibrium or when a maximum value is attained before solution. Where shrinking occurs, values were obtained after twice the normal time period used in the experiment.
[b] These values are at equilibrium swellings.
[c] The values of the swelling are maximum values obtained before reduction in volume occurred by solution.
[d] The value of shrinkage is obtained after a long time period and is not necessarily an equilibrium value.

In the zinc-free film equilibrium was reached only in n-heptane. In chloroform and acetone, after swelling irregularly to maximum value, solution took over and was rapid.

With respect to Commercial Products 1 and 2 the films swelled and disolved in the various solvents, except that Commercial Product 1 underwent shrinkage in n-heptane.

The swelling behavior of the films of the invention is unique and unobvious in that all of the zinc-containing films reach a maximum equilibrium swelling value and at this value resist dissolving. This condition of maximum swelling is attained by a regular change in shape as contrasted to the irregular phenomena which occurs with various other films as described in the discussion of Table VI above.

EXAMPLE 175

Two coating compositions of the invention and a similar composition free from zinc were used to prepare films. The films obtained were tested for resistance to indentation under constant load.

The coating compositions were similar to Formulation I. The zinc-containing compositions had a resin:polymer ratio of 40/60, a $Zn^{++}/COO^-$ of about 0.10, a $NH_4^+/COO^-$ of about 2.0. The composition contained a resin cut containing 19.1% solids comprising a styrene/acrylic acid resin having an acid number of about 226 and a molecular weight of about 2,140. The polymer consisted of methyl methacrylate 51%/2-ethylhexyl acrylate 40%/methacrylic acid 9% at a solids concentration of about 34.87%. The composition also contained Triton X-405, 6% of solids; tris-(butoxyethyl)phosphate, 40% of solids; and propylene glycol, 2% of the total composition. A second zinc-containing coating composition was used which had a $Zn^{++}/COO^-$ of about 0.20. A zinc-free coating composition was also used which was similar to the above-described coating composition except that it was free from zinc.

These three coating compositions were placed on glass substrates and formed films between about 50 and about 100μ thick. These films were aged for 25 days under ambient conditions. Then the films were tested with a Tukon Microhardness Tester (Machine No. MO-446, Microscope No. HD-8263). Five readings (in filar units) were taken at different locations on each film. The mean average of these filar units was converted to a Knoop hardness number. As shown in Table VII the two zinc-containing films had relatively high Knoop hardness values in comparison with the zinc-free film, thus indicating a high resistance to indentation. This property would be indicative of improved film resistance to marring and is one aspect of the unique structural integrity of the films of the invention. The effect on resistance to indentation due to increasing the zinc to carboxyl ratio is also shown.

TABLE VII

| Coating Composition | Constant Load in Grams | Knoop Hardness No. |
|---|---|---|
| Zinc-containing coating composition having a zinc:carboxyl ratio of 0.1 | 25 | 8.6 |
| Zinc-containing coating composition having a zinc:carboxyl ratio of 0.2 | 25 | 10.3 |
| Zinc-free coating composition | 25 | 7.7 |

*Example 176*

The following is a high solids content coating composition suitable for use as an adhesive varnish and has a resin to polymer weight ratio of 20:80, contains about 35.0% solids, and has a $NH_4^+/COC^-$ of about 1.0. This composition contains:

| Component: | Parts |
|---|---|
| Deionized water | 4.05 |
| A resin cut containing 19.66% solids comprising a styrene/acrylic acid resin cut having a molecular weight of about 2,270 and an acid value of about 192 and a pH of about 9.15 | 30.52 |
| Triton X-405 | 2.65 |
| A polymer containing methyl methacrylate 38%/2-ethylhexyl acrylate 53%/methacrylic acid 9% (50.17% solids) | 47.84 |
| Ammonium hydroxide [as described in 172 (a) above] | 1.18 |
| Tetrammine zinc (II) acetate (1.0 molar solution) ($Zn^{++}/COO^-$=0.20) | 9.76 |
| | 96.00 |

The films obtained from these coating compositions can be readily removed after prolonged periods of aging by the application of an aqueous mixture containing an alkaline complexing agent.

*Example 177*

The following is an example of a coating composition of the invention suitable for use as a protective coating for metals:

| Component: | Parts |
|---|---|
| A polymer containing methyl methacrylate 30%/2-ethylhexyl acrylate 61%/methacrylic acid 9% (34.65% solids) | 27.71 |
| A resin cut containing 19.08% solids comprising a styrene/acrylic acid resin having a molecular weight of about 2,140 and an acid value of about 226 | 201.26 |
| Deionized water | 200.15 |
| Tall oil fatty acid | 1.21 |
| Diethylamino ethanol | 0.55 |
| Tris-(butoxyethyl)phosphate | 2.42 |
| Ethyl carbitol | 10.10 |
| Triton X-405 (.30% solids) | 10.10 |
| Tetrammine zinc (II) acetate (0.5 molar solution) ($Zn^{++}/COO^-$=0.15) | 51.33 |
| | 504.83 |

The foregoing composition had a pH of about 9.5, a resin to polymer ratio of about 80:20 and contained approximately 12% solids.

This composition was applied to metals such as steel as an all-weather protectant. After prolonged periods of aging the film was removed from the steel substrate by the application of an aqueous mixture containing an alkaline complexing agent.

*Example 179*

The following example is illustrative of a coating composition containing resin and polymer which are available commercially outside of the United States having a resin to polymer weight ratio of about 40:60, containing about 13% solids and having a pH of about 9.2:

| Component: | Parts |
|---|---|
| Polymer E-231 emulsion containing the following monomers: methyl methacrylate, about 20%; butyl acrylate, about 20%; styrene, about 30%; acrylonitrile, about 19.2%; and methacrylic acid, about 5.8%; and containing about 5% emulsifier, containing about 40% solids | 18.00 |
| A resin cut containing about 20% solids comprising Alresat 618C and having a pH of about 8.3 | 24.00 |
| Tris-(butoxyethyl)phosphate | 0.46 |
| Propylene glycol | 2.00 |
| Deionized water and aqueous ammonia (sufficient to adjust to a final pH of about 9.2) | 51.18 |
| Tetrammine zinc (II) acetate (1.0 molar solution) ($Zn^{++}/COO^-$ of about 0.20) | 4.36 |
| | 100.00 |

*Example 180*

The following example is illustrative of a coating composition containing tall oil fatty acid and a polyethylene wax emulsion having a resin to polymer weight ratio of 40:60 containing about 13% solids and having a pH of about 9.5 comprising:

| Component: | Parts |
|---|---|
| A polymer containing methyl methacrylate 50%, 2-ethylhexyl acrylate 41%, and methacrylic acid 9% (about 35% solids) | 17.14 |
| A resin cut containing about 20% solids comprising a styrene/acrylic acid resin having a molecular weight of about 2,270 and an acid value of about 192 and having a pH of about 8.9 | 20.00 |
| A polyethylene wax emulsion (about 20% solids) containing AC 629 | 4.00 |
| Tris-butoxyethyl) phosphate | 0.30 |
| Tall oil fatty acid (acid value 190-200, rosin acid content 5% maximum) | 0.30 |
| Diethylaminoethanol | 0.27 |
| Deionized water, and aqueous ammonia sufficient to adjust to a final pH of about 9.5 | 45.21 |
| Tetrammine zinc (II) acetate (1.0 molar solution) $Zn^{++}/COO^-$ of about 0.20 | 4.28 |
| | 91.50 |

While various embodiments of this invention are described, it should be appreciated that the invention is not restricted thereto and that it is intended to cover all modifications of the invention will be apparent to one skilled in the art and which come within the scope of the appended claims. These zinc-containing coating compositions are described in co-pending application Serial No. 483,841, filed August 30, 1965, which application is abandoned. Application 483,841 is a continuations-in-part of application Serial No. 393,430, filed August 31, 1964, which application is now abandoned. Application 393,430 is a continuation-in-part of application Serial No. 329,206, filed December 9, 1963, now abandoned.

It has now been discovered that certain of the zinc-containing coating compositions described above have the unique and unobvious property of being self-sensitive. The term self-sensitive is defined in detail below. For the moment, it is sufficient to define this property as the ability of certain zinc-containing coating compositions to react with a film obtained from said composition and to disperse a substantial quantity of said film in the liquid coating composition. It has further been discovered that only certain zinc-containing coating compositions which have an equivalents of ammonium to carboxyl ratio of from about 0.8 to about 2.8 exhibit this property of self-sensitivity. In view of the unique structural integrity of the zinc-containing films described above it is particularly unobvious and unexpected that these films would have this property of self-sensitivity.

For the purposes of the present invention self-sensitive coating compositions are defined as certain of the zinc-containing coating compositions described in detail supra which have an equivalents of ammonium to total organic film former ligand equivalents from about 0.8 to about 2.5, a resin to polymer weight ratio from about 50:50 to about 95:5 and a $Zn^{++}/COO^-$ from about 0.075 to about 0.30 which when applied to the zinc-containing films described above disperses a substantial portion of said standard film.

More particularly, a self-sensitive coating composition is defined as a zinc coating composition such as defined above when applied to a standard self-sensitive film under the conditions described below will disperse from about 10 to about 50% by weight of said film. For the purposes of the present invention, a standard self-sensitive film is obtained from a zinc-containing coating composition comprising about 11.8% non-volatile, having an $NH_4^+/COO^-$ of about 1.69, a pH of about 9.59, a $Zn^{++}/COO^-$ of about 0.09, a resin to polymer ratio of about 83/17, a resin to wax ratio of about 89/11 comprising the following:

| Component: | Parts |
|---|---|
| Deionized water | 195.4 |
| A resin cut containing 15% non-volatile comprising a styrene/acrylic acid resin containing 59 mole percent styrene and 41 mole percent acrylic acid having a molecular weight of about 2500 and an acid value of about 225 and containing sufficient ammonia to provide a pH of about 9.2 and an $NH_4^+/COO^-$ of about 1.0 | 141.0 |
| A resin cut containing 15% non-volatile comprising Shanco 60–58 and containing sufficient ammonia to provide a pH of about 9.2 and an $NH_4^+/COO^-$ of about 1.6 | 94.0 |
| A polymer containing 2-ethylhexyl acrylate 61%/methylmethacrylate 30%/methacrylic acid 9% (about 35% non-volatile) | 20.6 |
| OPE–70 (Stabilizer) | 2.8 |
| Dowanol DE–SG (a glycol ether) | 14.2 |
| Tris-(butoxyethyl)phosphate | 3.8 |
| Ammonium hydroxide (28% solution) sufficient to provide the finished composition with a pH of about 9.59 | 7.2 |
| DQWA wax emulsion at about 31% non-volatile | 14.1 |
| Oleic acid | 5.7 |
| Zinc oxide ($Zn^{++}/COO^-$ of about .09) | 1.2 |
| | 500.0 |

A standard self-sensitive film was prepared from the above-described composition as follows: about 4 ml. of the coating composition was placed in a weighed aluminum moisture dish having a diameter of about 2¼ inches and a depth of about $1\!\!/\!\!16$ inch. The coating composition was allowed to stand for about 16 hours under ambient conditions. A substantially dry film was obtained which was then forced-air-dried at about 100° C. for about 30 minutes. The film obtained was from about 6 to about 10 mls. thick and weighed from about 0.4 to about 0.6 gram. About 15 ml. of the coating composition is then added to the film and the entire film surface is wetted. The moisture dish containing film and liquid coating composition is allowed to stand for approximately 30 minutes. After 30 minutes the liquid coating composition is poured from the film and the film is then dipped into 3 separate baths of deionized water for approximately 5 seconds with moderate swirling action. Noticeable etching of the film is observed. After reaching ambient temperature the film is forced-air-dry at about 100° C. for about 30 minutes. The difference in film weight between the treated and untreated film is then observed. The percent film removed is a measure of the self-sensitivity of the film and the corresponding coating composition.

Figure 2:
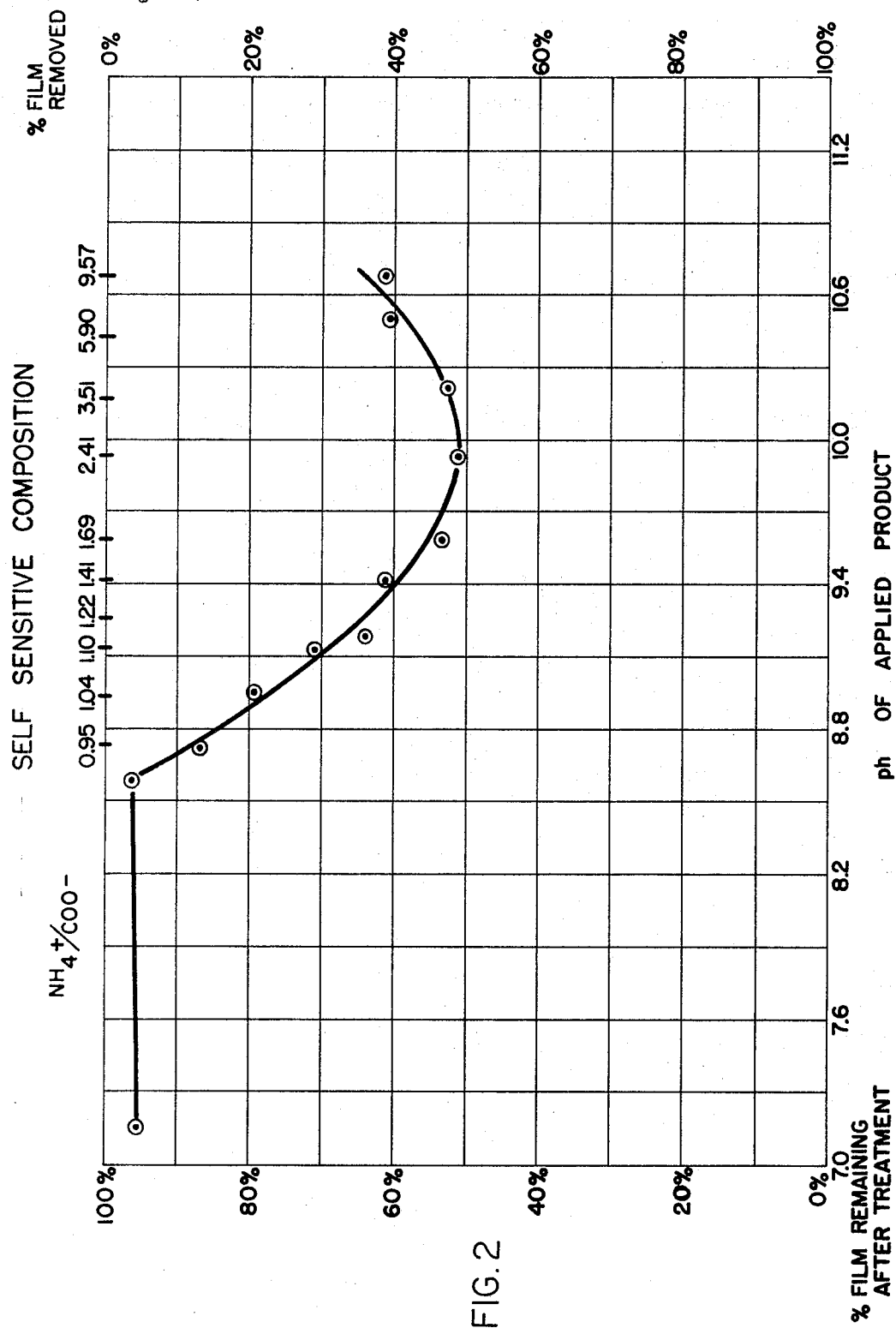
Figure 3:
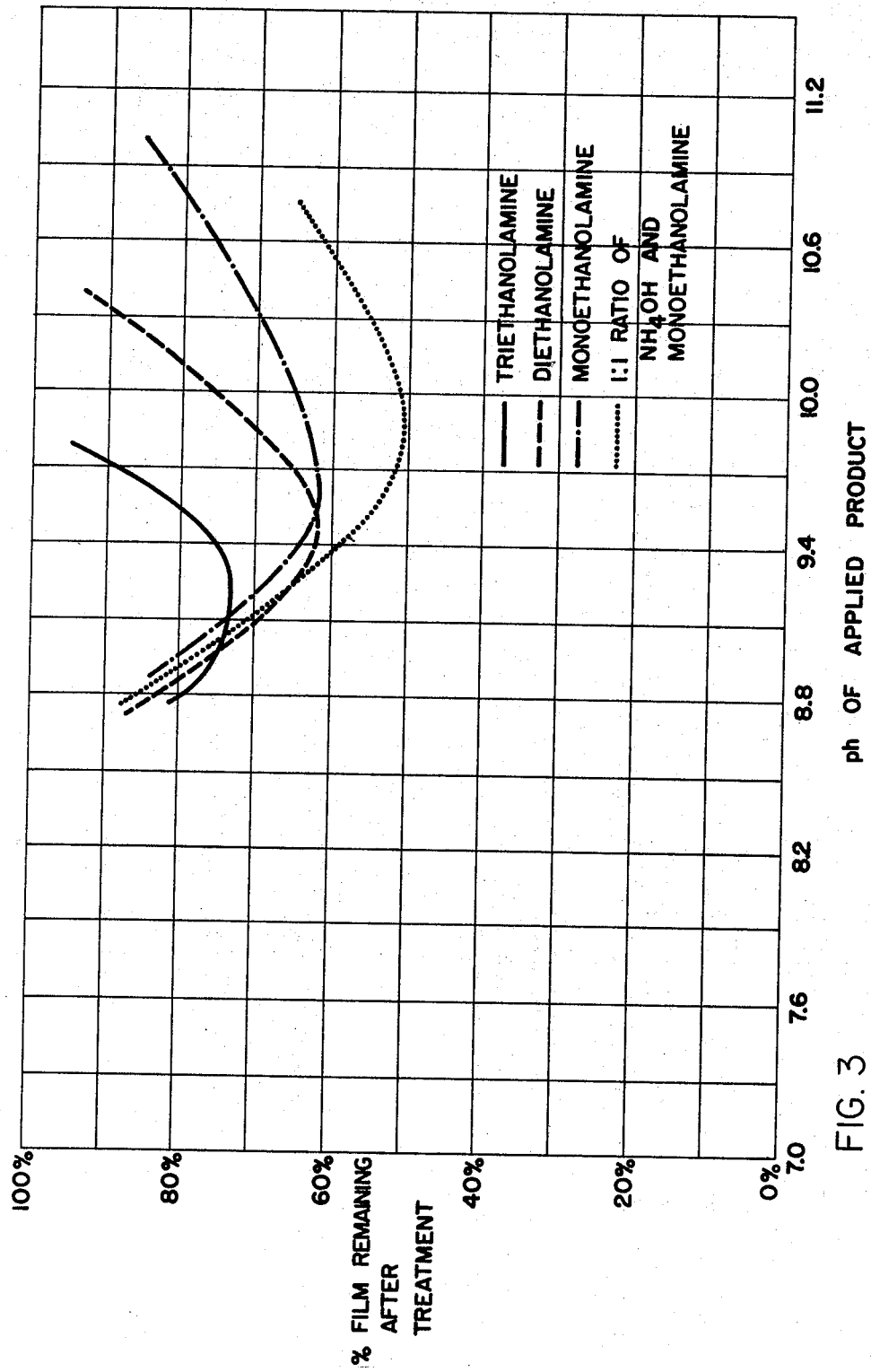

When the percent film removed is plotted against pH and $NH_4^+/COO^-$ ratio of the above-described coating composition at various $NH_4^+/COO^-$ ratios, a curve such as illustrated in FIGURE 2 of the drawing is obtained. In FIGURE 3 the percent film remaining after treatment is plotted against pH of the above-described coating composition which also contains triethanolamine, diethanolamine, monoethanolamine or a 1:1 ratio of ammonium hydroxide and monoethanolamine at various levels of pH. It is interesting to note in FIGURE 2 that as $NH_4^+/COO^-$ increases from about 0.8 to about 2.5 the percent film removed radically increases from about 5% to about 50%. However, as the $NH_4^+/COO^-$ increases above about 2.5 to about 9.57 the percent film removed decreases from about 50% to about 35%. Thus, unexpectedly it has been found that the equivalents of ammonium to film former ligands ratio ($NH_4^+/COO^-$) of the coating composition is critical to the self-sensitive performance obtained with these compositions. Similar observations are noted with the various alkaline substances employed and described in FIGURE 3 where the pH rather than the equivalents of ammonium to carboxyl ratio is plotted. It should be noted that the various alkaline substances employed were not used to cut the resin of the coating composition, rather, ammonia was used to cut the resin and the various alkaline substances were then added to the coating composition to obtain a given pH.

The self-sensitive coating compositions of the present invention are stable, aqueous compositions containing from about 5% to about 25% solids comprising:

A. An organic film former containing: a polyligand emulsion polymer substantially as described in detail under Polymer above, a resin cut containing an aqueous base and a polyligand alkali soluble resin substantially as described under Resin Cut above, with the proviso that the weight ratio of said resin to said polymer is from about 50:50 to about 95:5;

B. An aqueous base sufficient to provide an equivalents of ammonium to total organic film former ligand equivalents, $NH(R_2)_3^+/COO^-$, wherein $R_2$ can be hydrogen, alkyl and/or hydroxyalky, from about 0.8 to about 2.5;

C. A zinc-fugitive ligand complex which is capable of undergoing ligand transfer with ligands of the organic film former represented by the structural formula: $Zn[N(R_2)_3]_4Y_2$, wherein $R_2$ is as defined above and Y is as defined in the discussion of Metal-Fugitive Ligand Complex supra, wherein zinc is present in a concentration sufficient to provide a mole ratio of zinc ions to total organic film former ligand equivalents ($Zn^{++}/COO^-$) from about 0.075 to about 0.3; and D. A stabilizing agent such as described above with the proviso that the aqueous base concentration is sufficient to provide an increase in said $NH(R_2)_3^+/COO^-$ ratio up to about 1.7 with the total $NH(R_2)_3^+/COO^-$ ratio being no greater than about 2.5.

It is essential that the self-sensitive coating compositions of the invention be stable. That is, in order to obtain the self-sensitive films of the invention and in order to disperse a substantial amount of said film these self-sensitive coating compositions must be substantially free from gelation and/or precipitation and have substantially the same composition throughout. For the purpose of the present invention a stable self-sensitive coating composition is defined as a fluid substance which can be stored for prolonged periods and is:

(a) Substantially free from gelling,
(b) Substantially free from changes in viscosity and/or
(c) Substantially free from changes in the particle size of the dispersed solids.

Similar to the coating compositions described above the stability of the presently claimed self-sensitive coating compositions can be monitored by periodic optical density measurements. Additionally, however, the stability of these coating compositions can also be established by monitoring physical changes in said compositions during prolonged continuous exposure at high temperature conditions, i.e., 60° C. For example, a self-sensitive coating composition which is heated at 60° C. for about 30 days and remains substantially free from gelling and/or change in viscosity and/or change in particle size of the dispersed solids would be considered stable for the purposes of the present invention. In a preferred embodiment, the coating composition will remain substantially free from physical change for about 40 days at 60° C. In a particularly preferred embodiment, the coating compositions remain substantially free from physical change for at least about 60 days at 60° C.

(A) *Organic film former*

The organic film former of the self-sensitive composition is substantially as that described under Organic Film Former above with the proviso that the ratio of resin to polymer in the organic film former is from about 50:50 to about 95:5. That is, it has been observed that at resin to polymer ratios, substantially less than about 50:50, for example, 30:70, the self-sensitive property of the coating composition is substantially reduced. In a particularly preferred embodiment, the resin to polymer ratio is from about 75:25 to about 95:5.

The solids content of these compositions can range from 5% to about 25% by weight and in a particularly preferred embodiment from about 10% to about 20% by weight.

It has further been noted that when the self-sensitive coating compositions of the invention are to be employed as polishes and/or in other high gloss formulations which are exposed to foot traffic, i.e., floor coatings, it is preferable that the compositions contain a wax. Certain organic film former compositions which are useful as floor coating compositions are illustrated in FIGURE 1 of the drawing which is a triangular coordinate graph wherein each apex designates 100% of one of the three organic film former components. The arc *ab* combined with line *a'b'* defines the preferred organic film former compositions. The arc *ab* combined with the line *a'b'* defines the particularly preferred organic film former compositions. It is apparent that wax-free compositions, i.e., those falling along the line *ab*, can be used. However, numerous compositions containing at least a small percent of wax have been employed with satisfactory results. Various waxes can be used such as polyethylene wax, oxidized polyethylene wax, natural hard waxes such as carnauba wax and mixtures thereof. The oxidized polyethylene waxes are waxes in which oxygen has been introduced into the molecule, presumably in the form of carboxyl groups without materially altering the molecule in other respects. These oxidized polyethylene waxes are generally characterized by an assentially polyethylenic structure formed of recurring —$CH_2$— groups, by a molecular weight between about 1000 and about 5000 and by an oxygen content between about 1% and 17%. The following commercially available waxes have been employed in concentrations ranging from about 5 to about 30% by weight and preferably from about 10 to about 20% by weight: Polyem 20; DQWA–0355, a high density substantially linear polyethylene wax, having a molecular weight from about 2000 to about 2500 which has oxygenated terminal carbon atoms; L–3259–45, a high melting polyethylene wax; Grex 39–1, 39–2, and 39–4, which are substantially linear, high density, polyethylene waxes. Conmpositions containing these waxes are illustrated in Table VIII below.

(B) *Aqueous base*

Aqueous base is present in the coating compositions of the invention in a concentration sufficient to provide an equivalents of ammonium to total organic film former ligand equivalents, $NH(R_2)_3^+/COO^-$ of at least about 0.8 and up to about 2.5. Depending on the particular aqueous base employed, the $NH(R_2)_3^+/COO^-$ ratio can also be established at least approximately by the pH of the coating composition. Since the coating compositions of the invention perform somewhat as buffered solutions, it may be difficult to determine the exact $NH(R_2)_3^+$ concentration by means of pH. The self-sensitive coating compositions containing substantially all aqueous ammonia as the base have a pH range from about 8.7 to about 10 with a pH from about 9.0 to about 9.5 preferred. The relationship betwen pH and $NH_4^+/COO^-$ in these self-sensitive coating compositions is clearly illustrated in FIGURE 2 of the attached drawing. The curves illustrated in FIGURE 3 for various bases other than ammonia were established at $NH(R_2)_3^+/COO^-$ ratios substantially similar to that shown in FIGURE 2 for $NH_4^+/COO^-$, however, it is apparent that the pH of these compositions was substantially different from that illustrated in FIGURE 2.

In a preferred embodiment of the invention a portion of the aqueous base present will be contributed by the aqueous base of the resin cut. In a particularly preferred embodiment the resin is cut with aqueous ammonia.

(C) *Zinc-fugitive ligand complex*

The zinc-fugitive ligand complexes of the self-sensitive coating compositions are substantially as defined under Metal Fugitive Ligan Complexes above with the proviso that these complexes are ideally represented by the structural formula: $ZnN(R_2)_{34}Y_2$, wherein $R_2$ and $Y$ are as defined above. In addition, the concentration of zinc-fugitive ligand complex in the coating composition is preferably expressed as the ratio of zinc concentrate to organic film former ligan equivalents, i.e., $Zn^{++}/COO^-$ and ranges from about 0.075 to about 0.300 and preferably from about 0.1 to about 0.18. A particularly preferred zinc to carboxyl ratio is about 0.15.

(D) Stabilizing agent

The discussion at Stabilizing Agent above applies to the present self-sensitive compositions with the proviso that the aqueous base concentration is sufficient to provide an increase in $NH(R_2)_3{}^+/COO^-$ of up to about 1.7 with the total $NH(R_2)_3{}^+/COO^-$ being no greater than about 2.5.

EXAMPLES 181–211

The examples set forth in Table VIII below describe certain of the self-sensitive coating compositions of the invention suitable for use as temporary floor coatings. The stability and self-sensitive properties of the various compositions were observed and recorded.

These compositions contain various polymers, resins, and waxes. The polymers were prepared in a manner similar to that described in Example 169 above and added to the coating composition containing wax and resin. The various commercially available waxes and resins used are described in detail below. The ammonia to carboxyl ratio ($NH_4{}^+/COO^-$) of the various resin cuts ranged from about 1.5 to about 3.5. The resin to polymer weight ratio ranged from about 95:5 to about 40:60, the resin to wax ratio ranged from about 90:10 to about 73:27, and the zinc to carboxyl ratio ranged from about .1 to about .15. The pH of these various coating compositions ranged from about 9.0 to about 10.2.

Each of these compositions contained at least one water soluble, nonionic, ethylene oxide condensate emulsifier as a stabilizing agent. In addition to Triton X–405 described under Stabilizing Agent above, certain additional nonionic emulsifiers were also employed as stabilizing agents including: CO 995 which is a nonyl phenol/ethylene oxide condensate containing about 90 moles of ethylene oxide per nonyl phenol moiety. OPE–70 which is an octylphenol/ethylene oxide condensate containing about 70 moles of ethylene oxide per octylphenol moiety.

The self-sensitive property of these compositions was evaluated under the following conditions: one coat of the product, approximately 50 cc., was applied to a resilient vinyl asbestos test floor which was 18 by 72 inches long. The product was applied with a dry chenille pad. It was noted that about 50% of the product was absorbed in the pad during application. The coated floor was allowed to dry under ambient conditions for 18 to 24 hours. The floor was then scuffed with a soft black rubber heel. A second coat of the product was then applied with a dry chenille applier. The product was applied to the floor by passing the chenille applier over the dried surface 3 times. The floor was then allowing to dry and the percent heal mark removal, healing of scuff marks, leveling and gloss were observed. An outstanding performance which took into consideration all of the foregoing was rated 10, a satisfactory performance was rated 6, and an unsatisfactory performance was rated 4 or lower.

The various polymers used in these coating compositions are listed in Table VIII below in abbreviated form with the percent by weight of each monomer component listed immediately prior to the monomer abbreviation. The abbreviations are: EA=ethyl acrylate, MMA=methyl methacrylate, DVB=divinylbenzene, MAA=methacrylic acid, S=styrene, and 2EHA=2-ethylhexyl acrylate.

TABLE VIII

| Example No. | Polymer Type | Parts | Wax Type | Parts | Resin Type | Parts |
|---|---|---|---|---|---|---|
| 181 | 60 EA/28 MMA/6 DVB/6 MAA | 6.75 | Polyem 20 | 6.12 | Schenectady SR–91 | 38.78 |
| 182 | 25 EA/55 S/20 MAA | 11.25 | do | 6.12 | Shanco 60–97 | 33.75 |
| 183 | 25 EA/55 S/20 MAA | 11.25 | do | 6.12 | Shanco 60–98 | 33.75 |
| 184 | 25 EA/55 S/20 MAA | 11.25 | do | 6.12 | Shanco 64–72 | 33.75 |
| 185 | 25 EA/55 S/20 MAA | 6.75 | do | 6.12 | Lytron 812 | 38.25 |
| 186 | 25 EA/55 S/20 MAA | 11.25 | Polypropylene (Eastman) | 6.12 | Durez 23965 | 33.75 |
| 187 | 25 EA/55 S/20 MAA | 11.25 | do | 9.18 | do | 33.75 |
| 188 | 25 EA/55 S/20 MAA | 11.25 | do | 12.24 | do | 33.75 |
| 189 | 25 EA/55 S/20 MAA | 11.25 | Grex Emulsion | 9.18 | do | 33.75 |
| 190 | 25 EA/55 S/20 MAA | 11.25 | Polyem 20 | 9.18 | do | 33.75 |
| 191 | 25 EA/55 S/20 MAA | 13.50 | do | 6.12 | do | 31.50 |
| 192 | 25 EA/55 S/20 MAA | 15.75 | do | 7.30 | Shanco 60–58 | 29.20 |
| 193 | 25 EA/55 S/20 MAA | 11.25 | do | 7.30 | do | 29.20 |
| 194 | 61 2EHA/30 MMA/9 MAA | 11.25 | DQWA | 6.12 | do | 29.25 |
| 195 | 61 2EHA/30 MMA/9 MAA | 13.80 | do | 8.55 | do | 28.60 |
| 196 | 61 2EHA/26 MMA/13 MAA | 15.75 | Polyem 20 | 6.12 | Durez 19551 | 29.20 |
| 197 | 61 2EHA/26 MMA/13 MAA | 13.50 | DQWA | 6.12 | Shanco 60–58 | 31.50 |
| 198 | 61 2EHA/26 MMA/13 MAA | 18.00 | do | 6.12 | do | 27.00 |
| 199 | 61 2EHA/26 MMA/13 MAA | 11.25 | do | 4.08 | do | 33.75 |
| 200 | 61 2EHA/26 MMA/13 MAA | 11.25 | do | 3.06 | do | 33.75 |
| 201 | 53 2EHA/38 MMA/9 MAA | 18.00 | do | 6.02 | do | 27.00 |
| 202 | 53 2EHA/38 MMA/9 MAA | 11.25 | do | 4.48 | do | 33.75 |
| 203 | 61 2EHA/26 MMA/13 MAA | 12.75 | Polyem 20 | 3.92 | do | 19.10 |
| 204 | 61 2EHA/26 MMA/13 MAA | 19.10 | do | 3.92 | do | 12.80 |
| 205 | 25 EA/55 S/20 MAA | 12.79 | do | 3.20 | S/AA [a] | 12.80 |
|  | 61 2EHA/30 MMA/9 MAA | 12.79 | DQWA | 3.20 | Shanco 334 [b] | 12.80 |
| 206 | 28 MMA/60 EA/6 MAA/6 DVB | 11.01 | } Polyem 20 | 5.96 | S/AA [a] | 15.42 |
|  | 25 EA/55 S/20 MAA | 11.01 |  |  | Shanco 334 [b] | 6.60 |
| 207 | 25 EA/55 S/20 MAA | 14.20 | do | 3.00 | S/AA [a] | 16.40 |
|  | 61 2EHA/30 MMA/9 MAA | 8.82 | DQWA | 3.00 | Shanco 334 [b] | 6.62 |
| 208 | 61 2EHA/30 MMA/9 MAA | 7.62 | DQWA | 4.65 | Shanco 60–58 | 14.94 |
|  |  |  |  |  | S/AA [a] | 22.41 |
| 209 | 28 MMA/60 EA/6 MAA/6 DVB | 7.62 | DQWA | 4.65 | Shanco 60–58 | 14.94 |
|  |  |  |  |  | S/AA [a] | 22.41 |
| 210 | 61 2EHA/30 MMA/9 MAA | 2.24 | DQWA | 5.43 | Shanco 60–58 | 13.70 |
|  |  |  |  |  | S/AA [a] | 26.10 |
| 211 | 61 2EHA/30 MMA/9 MAA | 5.22 | DQWA | 5.43 | Shanco 60–58 | 18.26 |
|  |  |  |  |  | S/AA [a] | 26.10 |

See footnotes at end of tables.

TABLE VIII—Continued

| Example No. | Resin/Polymer, Weight Ratio | Resin/Wax, Weight Ratio | $Zn^{++}/COO^-$ c | Nonionic Emulsifier Type | Nonionic Emulsifier Parts | pH d | Stability e in days at 60° C. | Self-sensitive f |
|---|---|---|---|---|---|---|---|---|
| 181 | 85/15 | 86/14 | 0.13 | CO 995 | 4.00 | 10.15 | >60 | 10 |
| 182 | 75/25 | 85/15 | 0.10 | CO 995 | 4.20 | 9.70 | >60 | 10 |
| 183 | 75/25 | 85/15 | 0.10 | CO 995 | 4.20 | 9.70 | 53 | 8 |
| 184 | 75/25 | 85/15 | 0.10 | CO 995 | 4.20 | 9.70 | 59 | 6 |
| 185 | 86/14 | 86/14 | 0.10 | CO 995 | 4.20 | 9.80 | >60 | 10 |
| 186 | 75/25 | 85/15 | 0.10 | CO 995 | 4.20 | 9.80 | 47 | 10 |
| 187 | 75/25 | 79/21 | 0.10 | CO 995 | 4.20 | 9.80 | 47 | 10 |
| 188 | 75/25 | 73/27 | 0.10 | CO 995 | 4.20 | 9.70 | 47 | 10 |
| 189 | 75/25 | 80/20 | 0.10 | CO 995 | 4.20 | 9.70 | 44 | 10 |
| 190 | 75/25 | 79/21 | 0.10 | CO 955 | 4.20 | 9.90 | 46 | 8 |
| 191 | 70/30 | 84/16 | 0.10 | CO 995 | 4.20 | 10.20 | >60 | 10 |
| 192 | 65/35 | 80/20 | 0.15 | CO 995 | 4.20 | 9.40 | 49 | 6 |
| 193 | 72/28 | 80/20 | 0.15 | CO 995 | 4.20 | 9.40 | >60 | 6 |
| 194 | 68/32 | 85/15 | 0.15 | CO 995 | 4.20 | 9.40 | 60 | 8 |
| 195 | 68/32 | 77/23 | 0.15 | CO 995 | 2.10 | 9.30 | 60 | 10 |
| 196 | 65/35 | 83/17 | 0.10 | CO 995 | 2.10 | 9.80 | 42 | 10 |
| 197 | 70/30 | 84/16 | 0.15 | CO 995 | 2.10 | 9.20 | >60 | 10 |
| 198 | 60/40 | 82/18 | 0.15 | CO 995 | 2.10 | 9.00 | >60 | 10 |
| 199 | 75/25 | 88/12 | 0.15 | CO 955 | 2.10 | 9.30 | 49 | 10 |
| 200 | 75/25 | 87/13 | 0.15 | CO 995 | 2.10 | 9.20 | 57 | 10 |
| 201 | 60/40 | 82/18 | 0.15 | CO 995 | 2.10 | 9.00 | >60 | 10 |
| 202 | 75/25 | 89/11 | 0.15 | CO 995 | 1.05 | 9.20 | >60 | 10 |
| 203 | 60/40 | 83/17 | 0.12 | CO 995 | 0.75 | 9.45 | 44 | 8 |
| 204 | 40/60 | 77/23 | 0.12 | CO 995 | 0.75 | 9.30 | >60 | 4 |
| 205 | 50/50 | 80/20 | 0.100 | | | 9.00 | >72 | 4 |
| 206 | 50/50 | 79/21 | 0.100 | Triton X-405 | 3.57 | 9.00 | >90 | 4 |
| 207 | 50/50 | 80/20 | 0.100 | | | 9.00 | >58 | 4 |
| 208 | 83/17 | 89/11 | 0.150 | OPE-70 | 3.00 | 9.10 | >60 | 10 |
| 209 | 83/17 | 89/11 | 0.150 | OPE-70 | 3.00 | 9.10 | 38 | 10 |
| 210 | 95/5 | 88/12 | 0.125 | OPE-70 | 3.51 | 9.40 | 18 | 10 |
| 211 | 90/10 | 90/10 | 0.125 | OPE-70 | 3.51 | 9.10 | 35 | 10 | a An alkali soluble resin comprising 59 mole percent styrene/41 mole percent acrylic acid having a molecular weight of about 2200 and an acid number of about 225 prepared with benzoyl peroxide catalyst at about 3% by weight concentration.
b A condensation resin which is a rosin/maleic anhydride adduct condensed with a polyol having an acid number of about 183 and a molecular weight of less than 5,000.
c Moles of zinc complex to total organic film former ligand equivalents
d Of coating composition.
e Number of days before a substantial physical change in the coating composition was observed. Physical changes such as gelling, separation into phases and/or substantial increases in viscosity were considered.
f Based on percent of black heel mark removal, healing of scuff marks, leveling and gloss after second coat had dried.

It should be noted that essentially all of the self-sensitive compositions described in Table VIII above contain liquid film former compositions which fall within the area described by arc *ab* and the line *ab* of the triangular coordinate graph illustrated in FIGURE 1 of the drawings. It further should be observed that essentially all of the self-sensitive coating compositions which had a self-sensitive rating on the order of 10 fell within the area defined by the arc *a'b'* and the line *a'b'*. In contrast, it is noted that these coating compositions containing resin to polymer ratios of 50:50 or less had self-sensitive values of 4.

When a commercially available coating composition (referred to above as Commercial Product #2) was applied to a similar floor substrate under similar conditions and scuffed with black heel marks in a similar manner, it was difficult to remove more than about 10% of the black heel marks. Moreover, even by using severe scrubbing techniques, the black heel marks could not be easily removed with a second application of the commercial product to the scuffed substrate. The only way the heel marks were satisfactorily removed was with detergent and water.

EXAMPLE 212

The ability of certain self-sensitive coating compositions of the invention to effect black heel mark removal from a standard self-sensitive film was observed using the standard self-sensitive film described in detail above. The self-sensitive coating composition employed was similar to that described above for preparing the standard self-sensitive film with the proviso that the pH of the product was altered by the addition of aqueous ammonia and/or water.

The test tiles were prepared as follows: the factory finish was stripped from the tile by hand scrubbing with a nylon brush employing a commercial stripping composition having a pH of about 10.5 comprising an aqueous solution of sodium amine soaps at about 5% by weight, ethylene glycol, monoethylene ether at about 2% by weight, and sodium carbonate at about 10% by weight. The cleaned 9 x 9 inch test tiles were inclined 60°, flooded with the self-sensitive coating composition and stored in a vertical position for about 10 minutes at ambient conditions. The drainage bead of coating composition obtained at the bottom of the panel was wiped away and the panel dried in a vertical position for about 2 hours. A second coat of the composition was then applied to the panel using the technique described above except that the panel was turned 180°. The panel was dried for 18 to 24 hours. The coated tile was then inserted in the capsule of a Foster D Snell accelerated soiling capsule (TMI 24-2). Six rubber cubes each weighing approximately 190 grams were inserted in the capsule which was then rotated at 50 r.p.m. for about 2½ minutes. The drum was then rotated at 50 r.p.m. in the opposite direction for 2½ minutes. The coated test panels were removed and wiped free from dust particles, grit and the like. The panels were extensively marked with black marks comparable to black heel marks.

The scuffed panels were then placed on a Gardner Straight Line Washability Machine, model M-105 (Gardner Scrubber) which had been provided with a sponge in place of the standard bristle brush. The sponge was immersed in the self-sensitive coating compositions of the invention and the excess liquid was wrung out. The sponge was then inserted in the Gardner Scrubber.

For the purposes of the present invention a pass is defined as a complete cycle of the scrubber, i.e., travel of the sponge up and back across the tile. The number of passes required to remove the black heel mark were then plotted against pH of various self-sensitive products. The results are illustrated in FIGURE 4 of the attached drawings. It should be noted that when the pH of the coating composition was above about 8.75, 9 pass scrubs were required to remove the black heel marks. In contrast when the pH was substantially below 9, i.e., 8.25, the number of passes required to remove the black heel marks was greater than 300.

We claim:
1. A stable aqueous coating composition containing from about 5% by weight to about 40% by weight solids comprising:
   A. An organic film former containing:
      (1) a polyligand emulsion polymer having a mini- mum film forming temperature of less than about 80° C. comprising:
  (a) from about 5% to about 35% by weight of a ligand-containing, polymerizable, ethylenically unsaturated monomer having the structural formula $$CH_2=\overset{R_1}{\underset{|}{C}}-\overset{O}{\underset{\|}{C}}-OH$$

wherein $R_1$ is selected from the group consisting of hydrogen and a methyl radical and
  (b) from about 65% to about 95% by weight of at least two ligand-free, polymerizable, ethylenically unsaturated monomers selected from the group consisting of monomers having the structural formulas:

$$CH_2=\overset{CH_3}{\underset{|}{C}}-\overset{O}{\underset{\|}{C}}-OA, \quad CH_2=CH-\overset{O}{\underset{\|}{C}}-OA$$
$$CH_2=CH-X$$

and mixtures thereof wherein A is an organo radical having from about one to about ten carbon atoms, and X is an organo radical selected from the group consisting of aryl and alkaryl radicals;
(2) a resin cut containing:
  (a) an aqueous base selected from the group consisting of ammonium hydroxide, potassium hydroxide, sodium hydroxide, borax, methyl amine, ethyl amine, propyl amine, morpholine, and mixtures thereof, provided that at least a major amount of said alkaline substance has a fugitive cation and
  (b) a polyligand, alkali soluble resin having a number average molecular weight up to about 5,000 selected from the group consisting of:
    (1) rosin/maleic anhydride/polyol condensation resins having an acid number from about 120 to about 220,
    (2) addition resins having an acid number from about 140 to about 300 containing at least two ethylenically unsaturated monomers having the structural formulas: $CH_2=CH-X$ and $$CH_2=\overset{R_1}{\underset{|}{C}}-\overset{O}{\underset{\|}{C}}-OH$$

wherein X and $R_1$ are as defined above, and
    (3) mixtures of said condensation resins and said addition resins,
  wherein the weight ratio of said resin to said polymer is from about 20:80 to about 30:70;
B. Aqueous ammonia in a concentration sufficient to provide an equivalent of ammonium to total organic film former ligand equivalents ($NH_4^+/COO^-$) from about 0.7 to about 3.5;
C. A metal-fugitive ligand complex which is capable of undergoing ligand transfer with ligands of the organic film former, represented by the structural formula:

$$M(NH_3)_nY_2$$

wherein M is a metal selected from the group consisting of Zn, Cd, Cu, Ni, and mixtures thereof, $n$ is the coordination number of said metal and is an integer from four to six, Y is an equivalent of a carboxyl-containing anion selected from the group consisting essentially of carbonate, formate, acetate, said resin, said polymer, and mixtures thereof in a concentration sufficient to provide a mole ratio of metal ions to total organic film former ligand equivalents ($M^{++}/COO^-$) from about 0.075 to about 0.500; and D. A stabilizing agent selected from the group consisting of:
  (1) aqueous ammonia,
  (2) a water soluble, nonionic ethylene oxide condensate emulsifier, containing at least about 12 moles of ethylene oxide per mole of condensate, and
  (3) mixtures thereof,
    in a combination and in a concentration sufficient to provide a change in optical density of no greater than about 0.1 after about 7 days at about 51° C. with the proviso that the aqueous ammonia concentration is sufficient to provide an increase in said $NH_4^+/COO^-$ ratio up to about 2.8 with the total $NH_4^+/COO^-$ ratio being no greater than about 3.5 and that said emulsifier concentration is no greater than about 8% by weight.

2. A composition according to claim 1 wherein said addition resin contains up to about 25 mole percent of a modifying monomer selected from the group consisting of monomers having the structural formulas:

$$CH_2=\overset{CH_3}{\underset{|}{C}}-\overset{O}{\underset{\|}{C}}-OA, \quad CH_2=CH-\overset{O}{\underset{\|}{C}}-OA, \quad CH_2=CH-CN$$

$$\begin{array}{c} CH_2 \\ \| \\ CH \\ | \\ N \\ \diagup \quad \diagdown \\ CH_2 \quad C=O \\ | \quad\quad | \\ CH_2-CH_2 \end{array} \qquad \begin{array}{c} R_2 \\ \diagup\diagdown \\ | \quad |-R_3 \\ \diagdown N \diagup \end{array}$$

and mixtures thereof wherein A is as defined in claim 1 and $R_2$ is hydrogen or a methyl radical, and $R_3$ is a vinyl radical.

3. A composition according to claim 1 wherein said addition resin has a number average molecular weight from about 1,000 to about 5,000 wherein M is zinc and Y is comprised substantially of said addition resin.

4. A stable aqueous coating composition containing from about 5% by weight to about 20% by weight solids comprising:
A. An organic film former containing:
  (1) a polyligand emulsion polymer having a minimum film forming temperature of less than about 80° C. comprising:
    (a) from about 5% to about 35% by weight of a ligand-containing, polymerizable, ethylenically unsaturated monomer having the structural formula $$CH_2=\overset{R_1}{\underset{|}{C}}-\overset{O}{\underset{\|}{C}}-OH$$

wherein $R_1$ is selected from the group consisting of hydrogen and a methyl radical and
    (b) from about 65% to about 95% by weight of at least two ligand-free, polymerizable, ethylenically unsaturated monomers selected from the group consisting of monomers having the structural formulas:

$$CH_2=\overset{CH_3}{\underset{|}{C}}-\overset{O}{\underset{\|}{C}}-OA, \quad CH_2=CH-\overset{O}{\underset{\|}{C}}-OA$$
$$CH_2=CH-X$$

and mixtures thereof wherein A is an organo radical having from about one to about ten carbon atoms, and X is an organo radical selected from the group consisting of aryl and alkaryl radicals;
  (2) a resin cut containing:
    (a) an aqueous base selected from the group consisting of ammonium hydroxide, potassium hydroxide, sodium hydroxide, borax, methyl amine, ethyl amine, propyl amine, morpholine, and mixtures thereof, provided that at least a major amount of said alkaline substance has a fugitive cation and (b) a polyligand, alkali soluble resin having a number average molecular weight up to about 5,000 selected from the group consisting of:

(1) rosin/maleic anhydride/polyol condensation resins having an acid number from about 120 to about 220, (2) addition resins having an acid number from about 140 to about 300 containing at least two ethylenically unsaturated monomers having the structural formulas:

$$CH_2=CH-X \text{ and } CH_2=\underset{R_1}{C}-\underset{\parallel}{\overset{O}{C}}-OH$$

wherein X and $R_1$ are as defined above, and (3) mixtures of said condensation resins and said addition resins, wherein the weight ratio of said resin to said polymer is from about 20:80 to about 90:10;

B. Aqueous ammonia in a concentration sufficient to provide an equivalents of ammonium to total organic film former ligand equivalents ($NH_4^+/COO^-$) from about 0.7 to about 3.5;

C. A metal-fugitive ligand complex which is capable of undergoing ligand transfer with ligands of the organic film former, represented by the structural formula:

$$M(NH_3)_nY_2$$

wherein M is a metal selected from the group consisting of Zn, Cd, Cu, Ni, and mixtures thereof, $n$ is the coordination number of said metal and is an integer from four to six, Y is an equivalent of a carboxyl-containing anion selected from the group consisting essentially of carbonate, formate, acetate, said resin, said polymer, and mixtures thereof in a concentration sufficient to provide a mole ratio of metal ions to total organic film former ligand equivalents ($M^{++}/COO^-$) from about 0.075 to about 0.500; and D. A stabilizing agent selected from the group consisting of:

(1) aqueous ammonia, (2) a water soluble, nonionic ethylene oxide condensate emulsifier, containing at least about 12 moles of ethylene oxide per mole of condensate, and (3) mixtures thereof, in a combination and in a concentration sufficient to provide a change in optical density of no greater than about 0.1, after about 7 days at about 51° C. with the proviso that the aqueous ammonia concentration is sufficient to provide an increase in said $NH_4^+/COO^-$ ratio up to about 2.8 with the total $NH_4^+/COO^-$ ratio up to about 2.8 with the total $NH_4^+/COO^-$ ratio being no greater than about 3.5 and that said emulsifier concentration is no greater than about 8% by weight.

5. A stable aqueous coating composition containing up to about 20% by weight solids, having a minimum film forming temperature below about 25° C., and having a pH from about 8 to about 11 comprising:

A. An organic film former containing:

(1) a polyligand emulsion polymer having a minimum film forming temperature of less than about 80° C. comprising:

(a) from about 5% to about 25% by weight of a ligand-containing, polymerizable, ethylenically unsaturated monomer having the structural formula $$CH_2=\underset{R_1}{C}-\underset{\parallel}{\overset{O}{C}}-OH$$

wherein $R_1$ is selected from the group consisting of hydrogen and a methyl radical and (b) from about 75% to about 95% by weight of at least two ligand-free, polymerizable, ethylenically unsaturated monomers selected from the group consisting of monomers having the structural formulas:

$$CH_2=\underset{\underset{CH_2=CH-X}{|}}{\overset{CH_3}{C}}-\overset{O}{\overset{\parallel}{C}}-OA, \quad CH_2=CH-\overset{O}{\overset{\parallel}{C}}-OA$$

and mixtures thereof wherein A is an organo radical having from about one to about ten carbon atoms, and X is an organo radical selected from the group consisting of aryl and alkaryl radicals;

(2) a resin cut containing:

(a) an aqueous base containing an alkaline substance selected from the group consisting of ammonium hydroxide, potassium hydroxide, sodium hydroxide, borax, tetramethylammonium hydroxide, methyl amine, ethyl amine, propyl amine, morpholine, and mixtures thereof, provided that at least a major amount of said alkaline subsance has a fugitive cation, and (b) a polyligand, alkali soluble resin selected from the group consisting of:

(1) rosin/maleic anhydride/polyol condensation resins having an acid number from about 120 to about 220 and a number average molecular weight from about 600 to about 1,400, (2) addition resins having an acid number from about 140 to about 300 and a number average molecular weight from about 1,000 to about 5,000 containing at least two ethylenically unsaturated monomers having the structural formulas: $CH_2=CH-X$ and $$CH_2=\underset{R_1}{C}-\underset{\parallel}{\overset{O}{C}}-OH$$

wherein X and $R_1$ are as defined above, and (3) mixtures of said condensation resins and said addition resins, wherein the weight ratio of said resin to said polymer is from about 20:80 to about 90:10;

B. Aqueous ammonia in a concentration sufficient to provide an equivalent of ammonium to total organic film former ligand equivalents ($NH_4^+/COO^-$) from about 0.7 to about 3.5;

C. A metal-fugitive ligand complex which is capable of undergoing ligand transfer with ligands of the organic film former, represented by the structural formula:

$$M(NH_3)_nY_2$$

wherein M is a metal selected from the group consisting of Zn, Cd, Cu, Ni, and mixtures thereof, $n$ is the coordination number of said metal and is an integer from four to six, Y is an equivalent of a carboxyl-containing anion selected from the group consisting essentially of carbonate, formate, acetate, said resin, said polymer, and mixtures thereof in a concentration sufficient to provide a mole ratio of metal ions to total organic film former ligand equivalents ($M^{++}/COO^-$) from about 0.075 to about 0.500; and D. A stabilizing agent selected from the group consisting of:
  (1) aqueous ammonia,
  (2) a water soluble, nonionic ethylene oxide condensate emulsifier, containing at least about 12 moles of ethylene oxide per mole of condensate, and
  (3) mixtures thereof,
    in a combination and in a concentration sufficient to provide a change in optical density of no greater than about 0.03 after about 7 days at about 51° C. with the proviso that the aqueous ammonia concentration is sufficient to provide an increase in said $$NH_4^+/COO^-$$

ratio up to about 2.8 with the total $NH_4^+/COO^-$ ratio being no greater than about 3.5 and that said emulsifier concentration is no greater than about 8% by weight.

6. A film on a solid substrate containing captive ligands and having the properties of structural integrity and controlled removability said film comprising:
  (a) a polyligand emulsion polymer having a minimum film forming temperature of less than about 80° C. comprising:
    (1) from about 5% to about 35% by weight of a ligand-containing, polymerizable, ethylenically unsaturated monomer having the structural formula

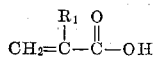

wherein $R_1$ is selected from the group consisting of hydrogen and a methyl radical and
    (2) from about 65% to about 95% by weight of at least two ligand-free, polymerizable, ethylenically unsaturated monomers selected from the group consisting of monomers having the structural formulas:

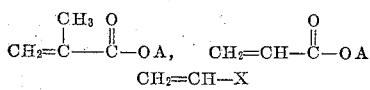

and mixtures thereof wherein A is an organo radical having from about one to about ten carbon atoms, and X is an organo radical selected from the group consisting of aryl and alkaryl radicals;
  (b) a polyligand, alkali soluble resin having a number average moleclular weight up to about 5,000 selected from the group consisting of:
    (1) resin/maleic anhydride/polyol condensation resins having an acid number from about 120 to about 220,
    (2) addition resins having an acid number from about 140 to about 300 containing at least two ethylenically unsaturated monomers having the structural formulas:

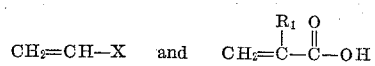

wherein X and $R_1$ are as defined above, and
    (3) mixtures of said condensation resins and said addition resins; and
  (c) a metal selected from the group consisting of Zn, Cd, Cu, and Ni wherein the ratio of moles of metal ions to total polymer and resin ligand equivalents is from about 0.075 to about 0.5.

7. A method of removing a film from a solid substrate containing captive ligands and having the properties of structural integrity and controlled removability said film containing:
  (a) a polyligand emulsion polymer having a minimum film forming temperature of less than about 80° C. comprising:
    (1) from about 5% to about 35% by weight of a ligand-containing, polymerizable, ethylenically unsaturated monomer having the structural formula

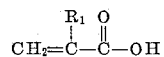

wherein $R_1$ is selected from the group consisting of hydrogen and a methyl radical and
    (2) from about 65% to about 95% by weight of at least two ligand-free, polymerizable, ethylenically unsaturated monomers selected from the group consisting of monomers having the structural formulas:

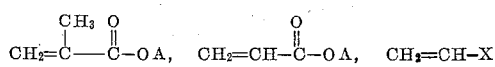

and mixtures thereof wherein A is an organo radical having from about one to about ten carbon atoms, and X is an organo radical selected from the group consisting of aryl and alkaryl radicals;
  (b) a polyligand, alkali soluble resin having a number average molecular weight up to about 5,000 selected from the group consisting of:
    (1) rosin/maleic anhydride/polyol condensation resins having an acid number from about 120 to about 220,
    (2) addition resins having an acid number from about 140 to about 300 containing at least two ethylenically unsaturated monomers having the structural formulas:

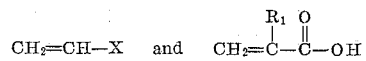

wherein X and $R_1$ are as defined above, and
    (3) mixtures of said condensation resins and said addition resins; and
  (c) a metal selected from the group consisting of Zn, Cd, Cu, and Ni wherein the ratio of moles of metal to total ligand equivalents is from about 0.075 to about 0.5, comprising: applying to said film an aqueous alkaline complexing agent which will effect ligand displacement with at least some of said captive ligands and which will effect alkaline salt formation with at least some of the ligands and removing the film components wherein the aqueous alkaline complexing agent comprises an aqueous solution containing a complexing agent selected from the group consisting of ammonium hydroxide, sodium hydroxide, tetramethyl ammonium hydroxide $(NH_4)_2HPO_4$, $(NH_4)_2CO_3$, potassium, and sodium phosphates and carbonates and mixtures thereof.

8. A stable aqueous coating composition containing from about 5% by weight to about 20% by weight solids, having a minimum film forming temperature below about 25° C., and having a pH from about 8 to about 11 comprising:
  (A) An organic film former containing:
    (1) a polyligand emulsion polymer having a minimum film forming temperature of less than about 80° C. comprising:
      (a) from about 5% to about 25% by weight methacrylic acid monomer and
      (b) from about 75% to about 95% by weight of at least two ligand-free, polymerizable, ethylenically unsaturated monomers selected from the group consisting of monomers having the structural formulas:

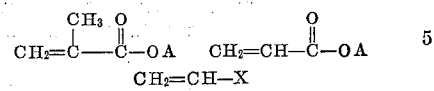

and mixtures thereof wherein A is an organo radical having from about one to about ten carbon atoms, and X is an organo radical selected from the group consisting of aryl and alkaryl radicals;
(2) a resin cut containing:
(a) an aqueous base containing an alkaline substance selected from the group consisting of ammonium hydroxide, potassium hydroxide, sodium hydroxide, borax, tetramethylammonium hydroxide, methyl amine, ethyl amine, propyl amine, morpholine, and mixtures thereof, provided that at least 50% of the moles of said alkaline substance is ammonium hydroxide, and
(b) a polyligand, alkali soluble resin selected from the group consisting of:
(1) rosin/maleic anhydride/polyol condensation resins having an acid number from about 160 to about 210, and a number average molecular weight from about 600 to about 1,400,
(2) styrene/acrylic acid resins having an acid number from about 190 to about 230 and a number average molecular weight from about 1,000 to about 3,500, and
(3) mixtures of (1) and (2),
wherein the weight ratio of said resin to said polymer is from about 20:80 to about 90:10;
(B) Aqueous ammonia in a concentration sufficient to provide an equivalents of ammonium to total organic film former ligand equivalents ($NH_4^+/COO^-$) from about 0.7 to about 3.5;
(C) A zinc-ammonia complex which is capable of undergoing ligand transfer with ligands of the organic film former, represented by the structural formula:

$$Zn(NH_3)_4Y_2$$

wherein Y is an equivalent of a carboxyl-containing anion selected from the group consisting essentially of carbonate, formate, acetate, said resin, said polymer, and mixtures thereof in a concentration sufficient to provide a mole ratio of zinc ions to total organic film former ligand equivalents $Zn^{++}/COO^-$ from about 0.1 to about 0.2; and
(D) A stabilizing agent selected from the group consisting of:
(1) aqueous ammonia,
(2) a water soluble, nonionic ethylene oxide condensate emulsifier containing from about 12 to about 100 moles of ethylene oxide per mole of condensate, selected from the group consisting of alkylphenoxy-polyethoxyethanols containing alkyl groups having from about 7 to about 18 carbon atoms, polyethoxyethanol derivatives of methylene linked alkyl phenols, polyethoxy alkylmercaptans wherein the alkylmercaptans contain from about 9 to about 14 carbon atoms, polyethoxyalkylthiophenols containing alkyl groups having from about 6 to about 15 carbon atoms, polyethoxycarboxylic acids containing from about 11 to about 16 carbon atoms and polyethoxyalkanols containing from about 8 to about 16 carbon atoms and mixtures thereof, and
(3) mixtures of 1 and 2 in a combination and in a concentration sufficient to provide a change in optical density of no greater than about 0.1, after about 7 days at about 51° C. with the proviso that the aqueous ammonia concentrate is sufficient to provide an increase in said $NH_4^+/COO^-$ ratio up to about 2.8 with the total $NH_4^+/COO^-$ ratio being no greater than about 3.5 and that said emulsifier concentrate is no greater than about 8% by weight.

9. A stable, self-sensitive aqueous coating composition containing from about 5% by weight to about 25% by weight solids comprising:
(A) An organic film former containing:
(1) a polyligand emulsion polymer having a minimum film forming temperature of less than about 80° C. comprising:
(a) from about 5% to about 35% by weight of a ligand-containing, polymerizable, ethylenically unsaturated monomer having the structural formula

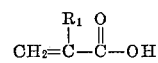

wherein $R_1$ is selected from the group consisting of hydrogen and a methyl radical and
(b) from about 65% to about 95% by weight of at least two ligand-free, polymerizable, ethylenically unsaturated monomers selected from the group consisting of monomers having the structural formulas:

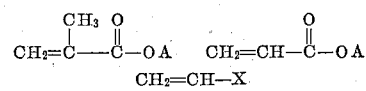

and mixtures thereof wherein A is an organo radical having from one to about ten carbon atoms, and X is an organo radical selected from the group consisting of aryl and alkaryl radicals;
(2) a resin cut containing:
(a) an aqueous base, selected from the group consisting of ammonium hydroxide, potassium hydroxide, sodium hydroxide, borax, tetramethylammonium hydroxide, methyl amine, ethyl amine, propyl amine, morpholine, and mixtures thereof, provided that at least a major amount of the moles of said alkaline base has a fugitive cation, and
(b) a polyigand, alkali soluble resin having a number average molecular weight up to about 5,000 selected from the group consisting of:
(1) rosin/maleic anhydride/polyol condensation resins having an acid number from about 120 to about 220,
(2) addition resins having an acid number from about 140 to about 300 containing at least two ethylenically unsaturated monomers having the structural formulas:

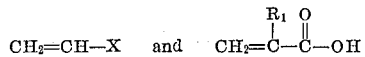

wherein X and $R_1$ are as defined above, and
(3) mixtures of said condensation and addition resins,
wherein the weight ratio of said resin to said said polymer is from about 50:50 to about 95:5;
(B) Aqueous ammonia in a concentration sufficient to provide an equivalent of ammonium to total organic film former ligand equivalents, $NH(R_2)_3^+/COO^-$ wherein $R_2$ is selected from the group consisting of hydrogen and alkyl and hydroxyalkyl radicals, from about 0.8 to about 2.5;

(C) A zinc-fugitive ligand complex which is capable of undergoing ligand transfer with ligands of the organic film former, represented by the structural formula:

$$Zn[N(R_2)_3]_4Y_2$$

wherein $R_2$ is as defined above and Y is an equivalent of a carboxyl-containing anion selected from the group consisting essentially of carbonate, formate, acetate, said resin, said polymer, and mixtures thereof in a concentration sufficient to provide a mole ratio of zinc ions to total organic film former ligand equivalents ($Zn^{++}/COO^-$) from about 0.075 to 0.300; and (D) A stabilizing agent selected from the group consisting of:
  (1) aqueous ammonia,
  (2) a water soluble, nonionic ethylene oxide condensate emulsifier containing at least about 12 moles of ethylene oxide per mole of condensate, and
  (3) mixtures thereof
  in a combination and in a concentration sufficient to provide a change in optical density of no greater than about 0.1, after about 7 days at about 51° C. with the proviso that the aqueous base concentration is sufficient to provide an increase in said $NH(R_2)_3{}^+/COO^-$ ratio up to about 1.7 with the total $NH(R_2)_3{}^+/COO^-$ ratio being no greater than about 2.5 and that said emulsifier concentration is no greater than about 8% by weight.

10. A composition according to claim 9 wherein said addition resin contains up to about 25 mole percent of a modifying monomer selected from the group consisting of monomers having the structural formulas:

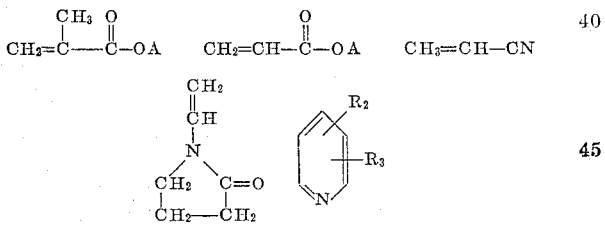

and mixtures thereof wherein A is as defined in claim 9 and $R_2$ is hydrogen or a methyl radical, and $R_3$ is a vinyl radical.

11. A composition according to claim 9 wherein at least 50% of the moles of said alkaline substance is ammonium hydroxide.

12. A stable, self-sensitive aqueous coating composition containing up to about 25% by weight solids, having a minimum film forming temperature below about 25° C., and having a $NH(R_2)_3{}^+/COO^-$ from about 0.8 to about 2.5 wherein $R_2$ is selected from the group consisting of hydrogen and alkyl and hydroxyalkyl radicals comprising:

(A) An organic film former containing:
  (1) a polyligand emulsion polymer having a minimum film forming temperature of less than about 80° C. comprising:
    (a) from about 5% to about 25% by weight of a ligand-containing, polymerizable, ethylenically unsaturated monomer having the structural formula

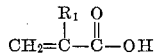

wherein $R_1$ is selected from the group consisting of hydrogen and a methyl radical and (b) from about 75% to about 95% by weight of at least two ligand-free, polymerizable, ethylenically unsaturated monomers selected from the group consisting of monomers having the structural formulas:

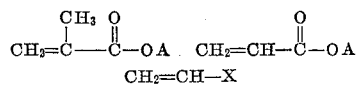

and mixtures thereof wherein A is an organo radical having from about one to about ten carbon atoms, and X is an organo radical selected from the group consisting of aryl and alkaryl radicals;

(2) a resin cut containing:
  (a) an aqueous base containing an alkaline substance selected from the group consisting of ammonium hydroxide, potassium hydroxide, sodium hydroxide, borax, tetramethylammonium hydroxide, methyl amine, ethyl amine, propylamine, morpholine, monoethanolamine, diethanolamine, triethanolamine and mixtures thereof, provided that at least a major amount of said alkaline substance has a fugitive cation, and
  (b) a polyligand, alkali soluble resin selected from the group consisting of:
    (1) rosin/maleic anhydride/polyol condensation resins having an acid number from about 120 to about 220 and a number average molecular weight from about 600 to about 5,000,
    (2) addition resins having an acid number from about 140 to about 300 and a number average molecular weight from about 1,000 to about 5,000 containing at least two ethylenically unsaturated monomers having the structural formulas:

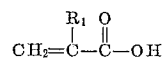

wherein X and $R_1$ are as defined above, and
    (3) mixtures of said condensation and addition resins,
  wherein the weight ratio of said resin to said polymer is from about 50:50 to about 95:5;

(B) A metal-fugitive ligand complex which is capable of undergoing ligand transfer with ligands of the organic film former, represented by the structural formula:

$$Zn[N(R_2)_3]_4Y_2$$

wherein $R_2$ is as defined above and Y is an equivalent of a carboxyl-containing anion selected from the group consisting essentially of carbonate, formate, acetate, said resin, said polymer, and mixtures thereof in a concentration sufficient to provide a mole ratio of zinc ions to total organic film former ligand equivalents ($Zn^{++}/COO^-$) from about 0.075 to about 0.300; and (C) A stabilizing agent selected from the group consisting of:
  (1) aqueous ammonia,
  (2) a water soluble, nonionic ethylene oxide condensate emulsifier containing at least about 12 moles of ethylene oxide per mole of condensate, and
  (3) mixtures thereof
  in a combination and in a concentration sufficient to provide a change in optical density of no greater than about 0.03 after about 7 days at about 51° C.

with the proviso that the aqueous ammonia concentration is sufficient to provide an increase in said $NH(R_2)_3^+/COO^-$ ratio up to about 1.7 with the total $NH(R_2)_3^+/COO^-$ ratio being no greater than about 2.5 and that said emulsifier concentration is no greater than about 8% by weight.

13. A stable, self-sensitive aqueous coating composition suitable for use as a protective floor coating containing from about 5% by weight to about 25% by weight solids comprising:
(A) An organic film former containing:
(1) a polyligand emulsion polymer having a minimum film forming temperature of less than about 80° C. comprising:
(a) from about 5% to about 35% by weight of a ligand-containing, polymerizable, ethylenically unsaturated monomer having the structural formula

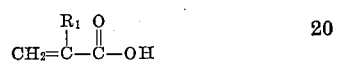

wherein $R_1$ is selected from the group consisting of hydrogen and a methyl radical and
(b) from about 65% to about 95% by weight of at least two ligand-free, polymerizable, ethylenically unsaturated monomers selected from the group consisting of monomers having the structural formulas:

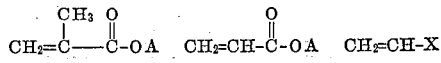

and mixtures thereof wherein A is an organo radical having from one to about ten carbon atoms, and X is an organo radical selected from the group consisting of aryl and alkaryl radicals;
(2) a resin cut containing:
(a) an aqueous base selected from the group consisting of ammonium hydroxide, potassium hydroxide, sodium hydroxide, borax, tetramethylammonium hydroxide, methyl amine, ethyl amine, propyl amine, morpholine, and mixtures thereof, provided that at least a major amount of the moles of said alkaline base has a fugitive cation, and
(b) a polyligand, alkali soluble resin having a number average molecular weight up to 5,000 selected from the group consisting of:
(1) rosin/maleic anhydride/polyol condensation resins having an acid number from about 120 to about 220,
(2) addition resins having an acid number from about 140 to about 300 containing at least two ethylenically unsaturated monomers having the structural formulas:

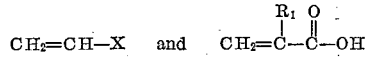

wherein X and $R_1$ are as defined above, and
(3) mixtures of said condensation and addition resins,
wherein the weight ratio of said resin to said polymer is from about 50:50 to about 95:5;
(3) a wax selected from the group consisting of natural and synthetic waxes and mixtures thereof wherein the relative amounts of said polymer, resin and wax are chosen so as to be represented by any point within the area defined by arc $ab$ and line $ab$ of FIGURE 1 of the annexed drawing;
(B) Aqueous ammonia in a concentration sufficient to provide an equivalent of ammonium to total organic film former ligand equivalents $NH(R_2)_3^+/COO^-$ wherein $R_2$ is selected from the group consisting of hydrogen and alkyl and hydroxyalkyl radicals from about 0.8 to about 2.5;
(C) A zinc-fugitive ligand complex which is capable of undergoing ligand transfer with ligands of the organic film former, represented by the structural formula:

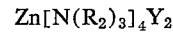

wherein $R_2$ is as defined above and Y is an equivalent of a carboxyl-containing anion selected from the group consisting essentially of carbonate, formate, acetate, said resin, said polymer, and mixtures thereof in a concentration sufficient to provide a mole ratio of zinc ions to total organic film former ligand equivalents ($Zn^{++}/COO^-$) from about 0.075 to about 0.300 and
(D) A stabilizing agent selected from the group consisting of:
(1) aqueous ammonia,
(2) a water soluble, nonionic ethylene oxide condensate emulsifier containing at least about 12 moles of ethylene oxide per mole of condensate, and
(3) mixtures thereof
in a combination and in a concentration sufficient to provide a change in optical density of no greater than about 0.1, after about 7 days at about 51° C. with the proviso that the aqueous base concentration is sufficient to provide an increase in said

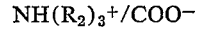

ratio up to about 1.7 with the total $NH(R_2)_3^+/COO^-$ ratio being no greater than about 2.5 and that said emulsifier concentration is no greater than about 8% by weight.

14. A stable, self-sensitive, aqueous coating composition suitable for use as a protective floor coating containing up to about 25% by weight solids, having a minimum film forming temperature below about 25° C., and having a $NH(R_2)_3^+/COO^-$ from about 0.8 to about 2.5 wherein $R_2$ is selected from the group consisting of hydrogen and alkyl and hydroxyalkyl radicals comprising:
(A) An organic film former containing:
(1) a polyligand emulsion polymer having a minimum film forming temperature of less than about 80° C. comprising:
(a) from about 5% to about 25% by weight of a ligand-containing, polymerizable, ethylenically unsaturated monomer having the structural formula

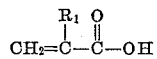

wherein $R_1$ is selected from the group consisting of hydrogen and a methyl radical and
(b) from about 75% to about 95% by weight of at least two ligand-free, polymerizable, ethylenically unsaturated monomers selected from the group consisting of monomers having the structural formulas:

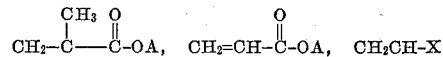

and mixtures thereof wherein A is an organo radical having from one to about ten carbon atoms, and X is an organo radical selected from the group consisting of aryl and alkaryl radicals;

(2) a resin cut containing:
  (a) an aqueous base containing an alkaline substance selected from the group consisting of ammonium hydroxide, potassium hydroxide, sodium hydroxide, borax, tetramethylammonium hydroxide, methyl amine, ethyl amine, propyl amine, morpholine, monoethanolamine, diethanolamine, triethanolamine, and mixtures thereof, provided that at least a major amount of said alkaline substance has a fugitive cation, and
  (b) a polyligand, alkali soluble resin selected from the group consisting of:
    (1) rosin/maleic anhydride/polyol condensation resins having an acid number from about 120 to about 220 and a number average molecular weight from about 600 to about 5,000,
    (2) addition resins having an acid number from about 140 to about 300 and a number average molecular weight from about 1,000 to about 5,000 containing at least two ethylenically unsaturated monomers having the structural formulas:

$$CH_2=CH-X \quad \text{and} \quad CH_2=\overset{R_1}{\underset{|}{C}}-\overset{O}{\underset{\|}{C}}-OH$$

wherein X and $R_1$ are as defined above, and
    (3) mixtures of said condensation and addition resins,
wherein the weight ratio of said resin to said polymer is from about 50:50 to about 95:5;
  (3) a wax selected from the group consisting of natural and synthetic waxes and mixtures thereof wherein the relative amounts of said polymer, resin and wax are chosen so as to be represented by any point within the area defined by arc *ab* and line *ab* of FIGURE 1 of the annexed drawing.
(B) A metal-fugitive ligand complex which is capable of undergoing ligand transfer with ligands of the organic film former, represented by the structural formula:

$$Zn[N(R_2)_3]_4Y_2$$

wherein $R_2$ is as defined above and Y is an equivalent of a carboxyl-containing anion selected from the group consisting essentially of carbonate, formate, acetate, said resin, said polymer, and mixtures thereof in a concentration sufficient to provide a mole ratio of zinc ions to total organic film former ligand equivalents ($Zn^{++}/COO^-$) from about 0.075 to about 0.300; and
(C) A stabilizing agent selected from the group consisting of:
  (1) aqueous ammonia,
  (2) a water soluble nonionic ethylene oxide condensate emulsifier containing at least about 12 moles of ethylene oxide per mole of condensate, and
  (3) mixtures thereof
in a combination and in a concentration sufficient to provide a change in optical density of no greater than about 0.03 after about 7 days at about 51° C. with the proviso that the aqueous ammonia concentration is sufficient to provide an increase in said $NH(R_2)_3{}^+/COO^-$ ratio up to about 1.7 with the total $NH(R_2)_3{}^+/COO^-$ ratio being no greater than about 2.5 and that said emulsifier concentration is no greater than about 8% by weight.

15. A self-sensitive film on a solid substrate containing captive ligands and having the properties of structural integrity and controlled removability, said film comprising:
(A) A polyligand emulsion polymer having a minimum film forming temperature of less than about 80° C. comprising:
  (1) from about 5% to about 35% by weight of a ligand-containing, polymerizable, ethylenically unsaturated monomer having the structural formula $$CH_2=\overset{R_1}{\underset{|}{C}}-\overset{O}{\underset{\|}{C}}-OH$$

wherein $R_1$ is selected from the group consisting of hydrogen and a methyl radical and
  (2) from about 65% to about 95% by weight of at least two ligand-free, polymerizable, ethylenically unsaturated monomers selected from the group consisting of monomers having the structural formulas:

$$CH_2=\overset{CH_3}{\underset{|}{C}}-\overset{O}{\underset{\|}{C}}-OA \quad CH_2=CH-\overset{O}{\underset{\|}{C}}-OA$$
$$CH_2=CH-X$$

and mixtures thereof wherein A is an organo radical having from about one to about ten carbon atoms, and X is an organo radical selected from the group consisting of aryl and alkaryl radicals;
(B) A polyligand, alkali soluble resin having a number average molecular weight up to about 5,000 selected from the group consisting of:
  (1) rosin/maleic anhydride/polyol condensation resins having an acid number from about 120 to about 220,
  (2) addition resins having an acid number from about 140 to about 300 containing at least two ethylenically unsaturated monomers having the structural formulas:

$$CH_2=CH-X \quad \text{and} \quad CH_2=\overset{R_1}{\underset{|}{C}}-\overset{O}{\underset{\|}{C}}-OH$$

wherein X and $R_1$ are as defined above, and
  (3) mixtures of said condensation resins and said addition resins; and
(C) Zinc, wherein the ratio of moles of zinc ions to total polymer and resin ligand equivalents is from about 0.075 to about 0.3.

References Cited by the Examiner

UNITED STATES PATENTS

| | | | |
|---|---|---|---|
| 2,754,280 | 7/1956 | Brown | 260—29.6 |
| 2,757,106 | 7/1956 | Brown | 260—29.6 |
| 2,778,283 | 1/1957 | Bettoli | 92—40 |
| 2,795,564 | 6/1957 | Conn | 260—29.6 |
| 2,901,452 | 8/1959 | West | 260—29.6 |
| 2,972,592 | 2/1961 | Brown | 260—29.6 |
| 3,079,358 | 2/1963 | Welzmann | 260—901 |
| 3,123,505 | 3/1964 | Pocock | 148—6.2 |

FOREIGN PATENTS

| | | |
|---|---|---|
| 572,491 | 3/1959 | Canada. |
| 622,140 | 6/1961 | Canada. |
| 749,801 | 5/1956 | Great Britain. |

OTHER REFERENCES

Resin Review, vol. VI, No. 2, pages 23–24 made of record, bulletin of Rohm & Haas Company.

LEON J. BERCOVITZ, *Primary Examiner.*

F. McKELVEY, *Assistant Examiner.*